Jan. 1, 1935.  A. J. SMITH  1,986,766
APPARATUS FOR AND METHOD OF FABRICATING GLASSWARE
Filed June 3, 1932    9 Sheets-Sheet 4
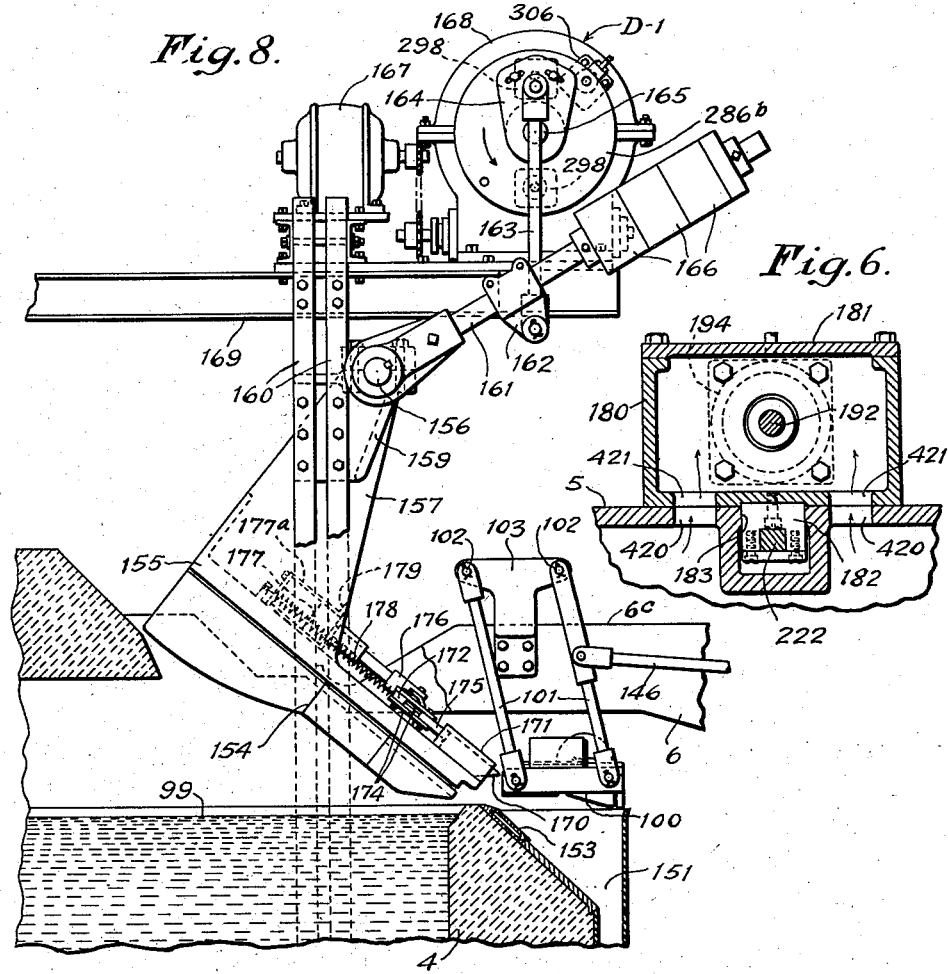
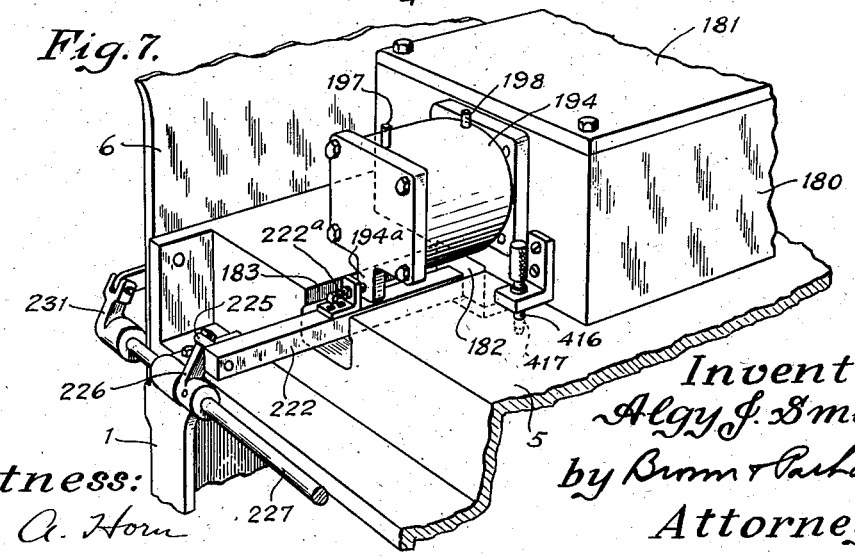

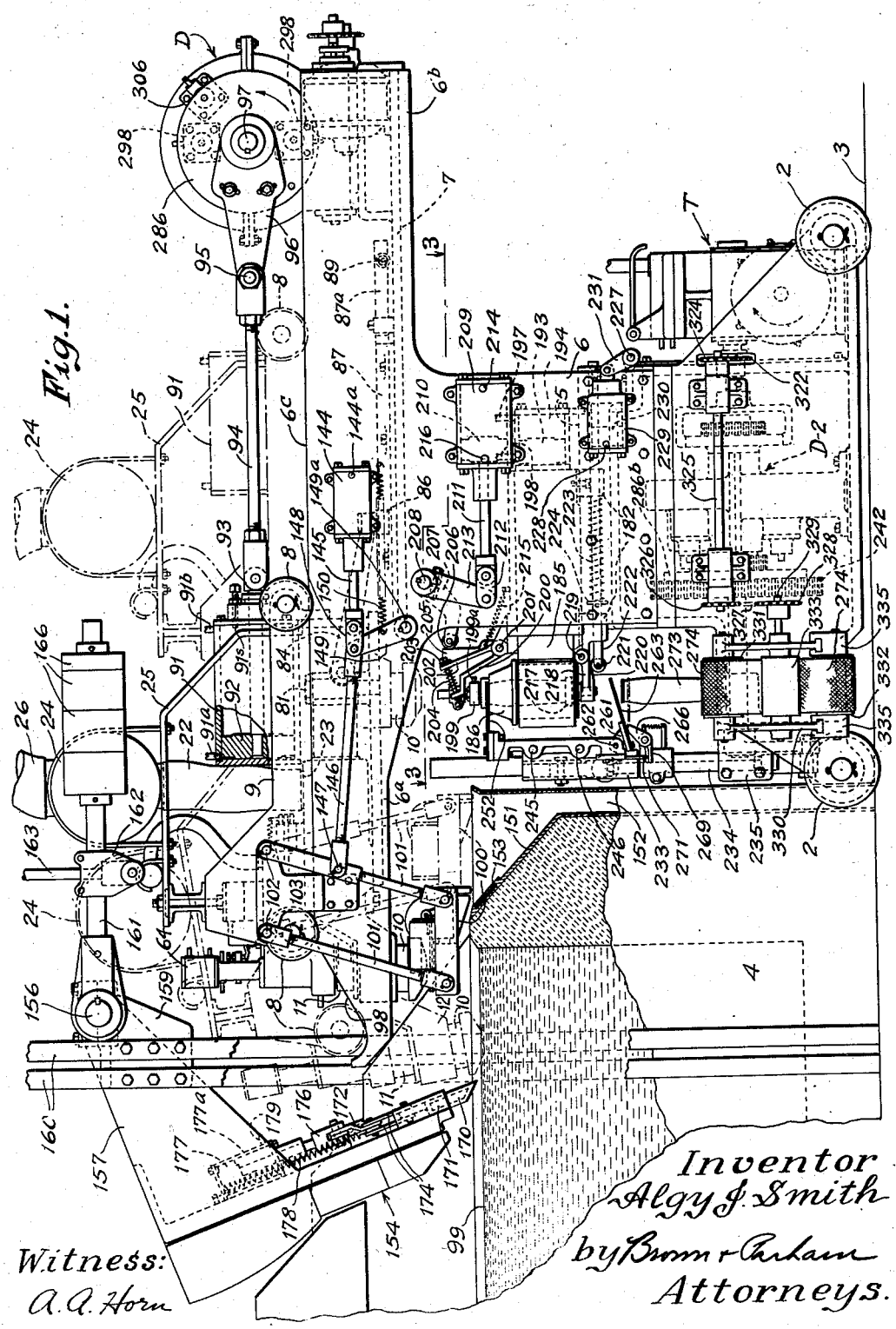

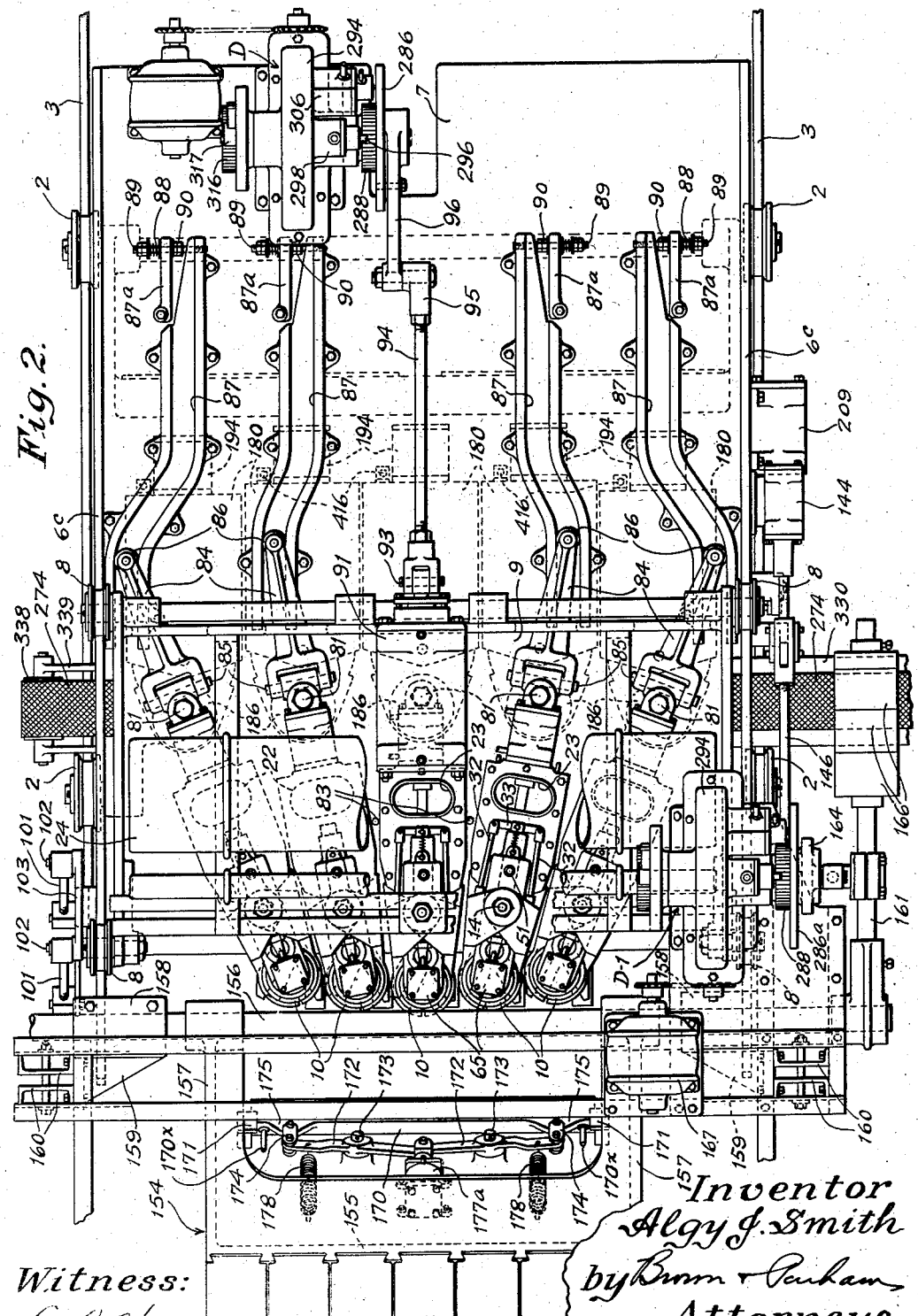

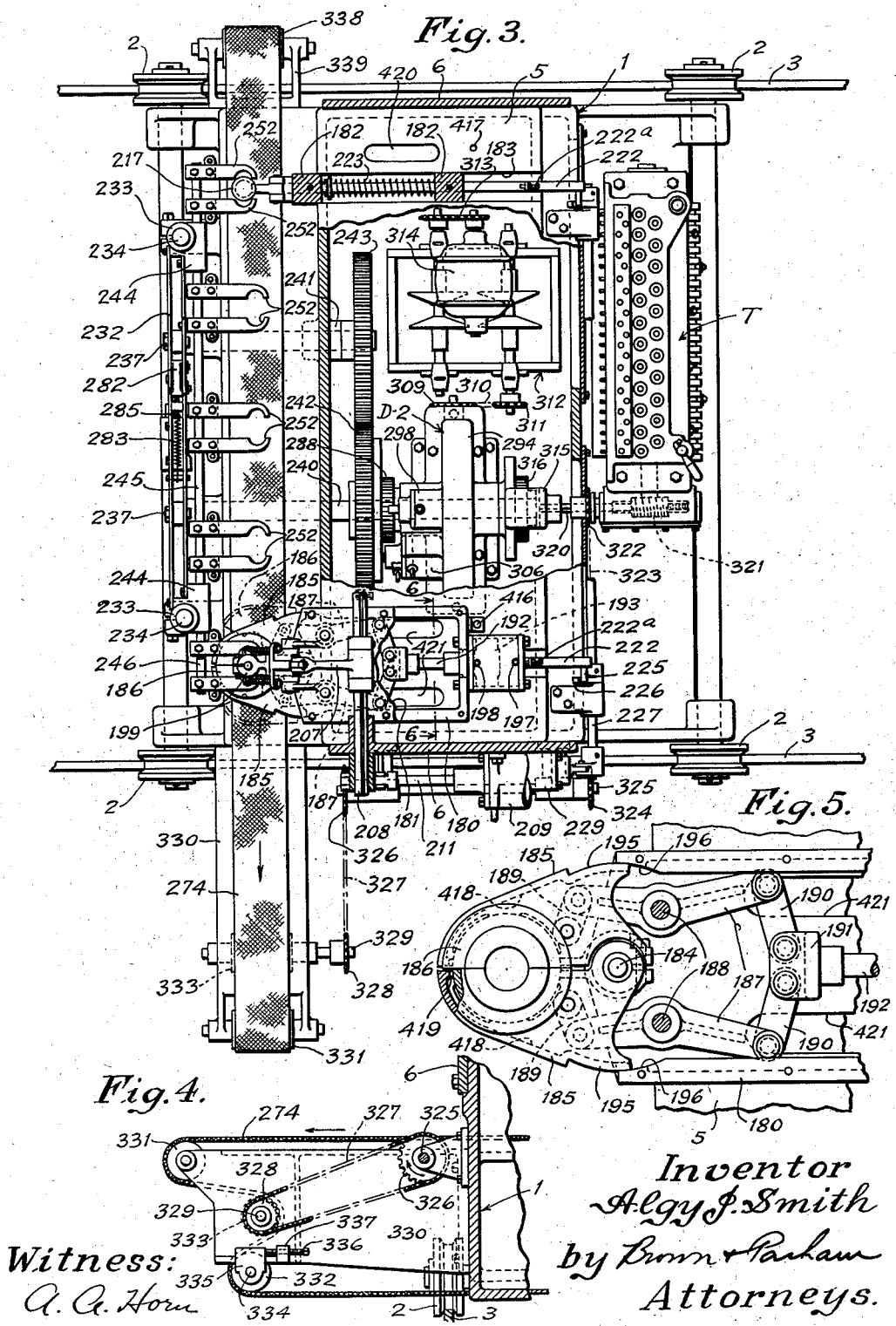

Jan. 1, 1935.  A. J. SMITH  1,986,766
APPARATUS FOR AND METHOD OF FABRICATING GLASSWARE
Filed June 3, 1932     9 Sheets-Sheet 5

Witness:
A. A. Horn

Inventor
Algy J. Smith
by Brown & Parham
Attorneys.

Jan. 1, 1935. A. J. SMITH 1,986,766
APPARATUS FOR AND METHOD OF FABRICATING GLASSWARE
Filed June 3, 1932 9 Sheets-Sheet 6
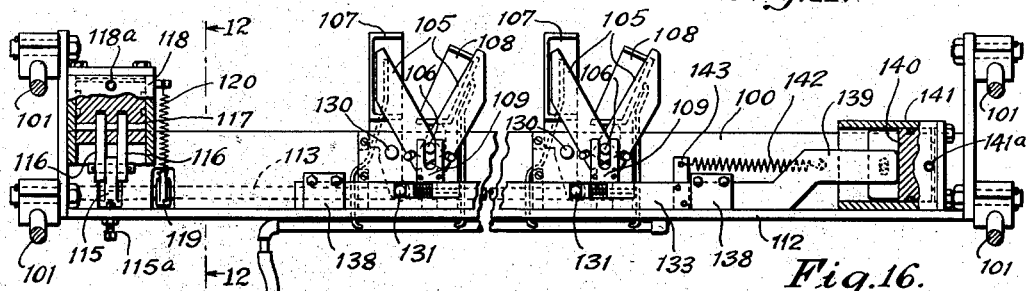
Inventor
Algy J. Smith
by Brown & Parham
Attorneys
Witness:
A. A. Horn

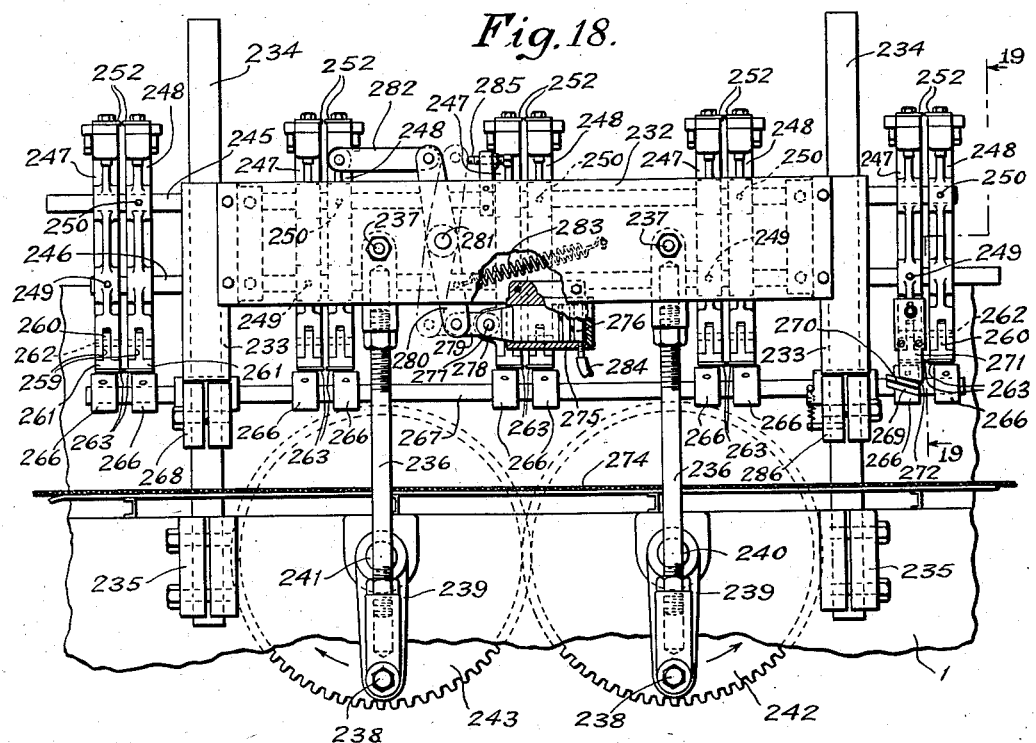
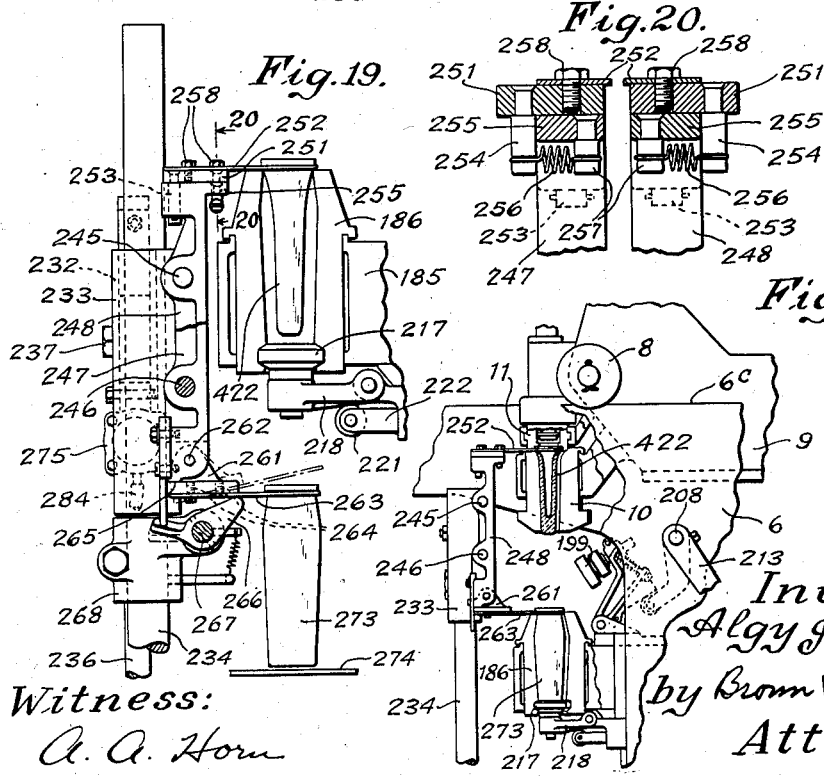

Jan. 1, 1935. A. J. SMITH 1,986,766
APPARATUS FOR AND METHOD OF FABRICATING GLASSWARE
Filed June 3, 1932 9 Sheets-Sheet 8

Witness:
A. A. Horn

Inventor
Algy J. Smith
by Brunn & Parham
Attorneys.

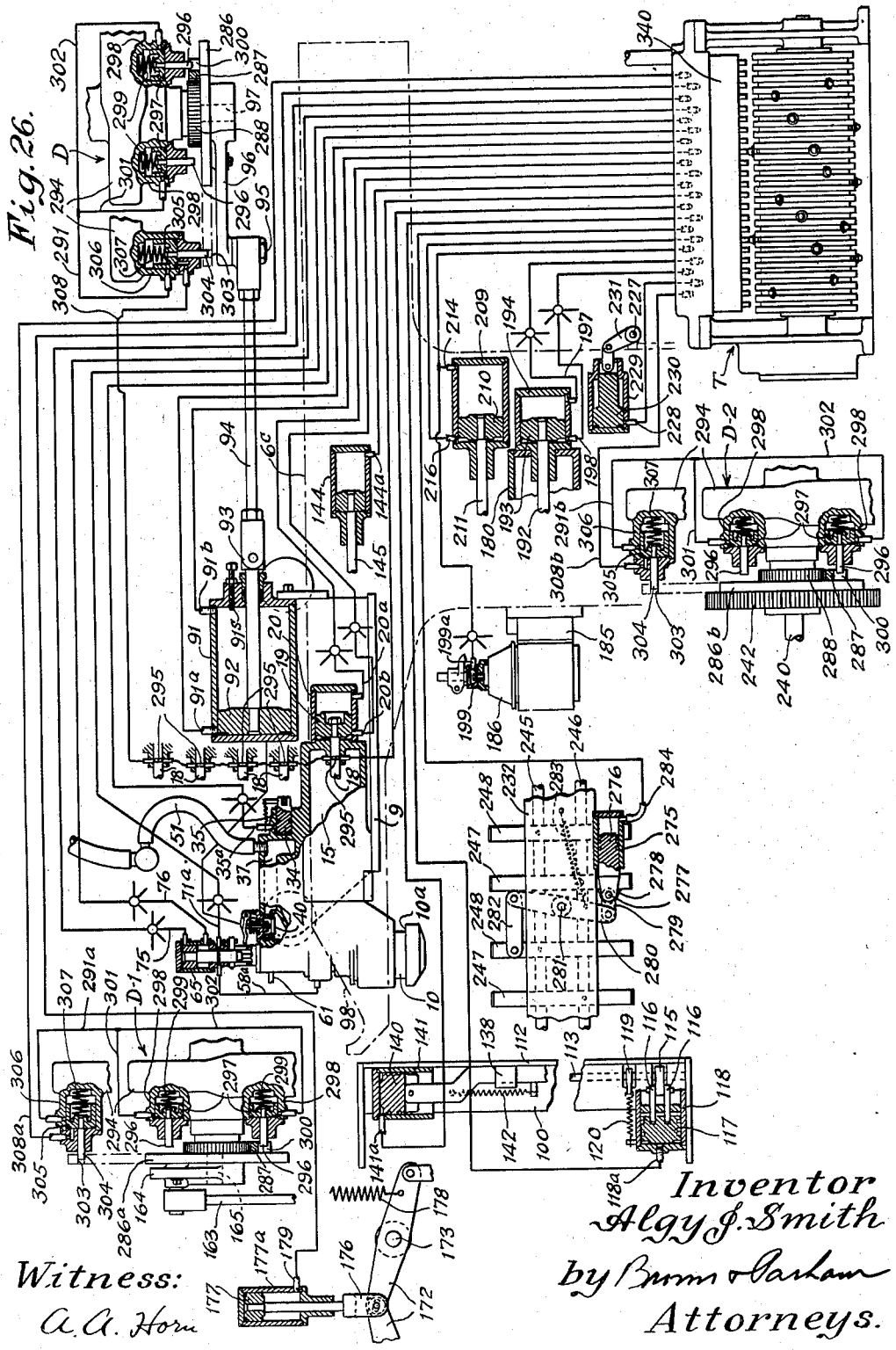

Patented Jan. 1, 1935

1,986,766

UNITED STATES PATENT OFFICE 1,986,766

APPARATUS FOR AND METHOD OF FABRICATING GLASSWARE

Algy J. Smith, Bloomfield, Conn., assignor to Hartford-Empire Company, Hartford, Conn., a corporation of Delaware Application June 3, 1932, Serial No. 615,111

30 Claims. (Cl. 49—5)

This invention relates to glassware fabricating machines of the type having parison or blank molds which are reciprocated between a station at which they are charged with molten glass and a transfer station at which parisons which have been formed therein are transferred to other molds in which further fabricating operations are to be effected.

An object of the invention is to provide a glassware fabricating machine of the type above referred to which will afford facilities for the substantially simultaneous charging of a relatively large number of blank or parison molds with glass charges from a given source of supply, and the substantially simultaneous fabrication of such charges into articles of glassware.

A further object of the invention is the provision in a machine of the character described of a plurality of parison or blank molds and suitable operating and supporting mechanisms, whereby such blank molds will be brought close together as they are moved to a station at which they may gather charges of glass by suction from a gathering pool and will be moved apart as they are retracted from such gathering station to permit convenient and desirable operations and movements of parts of the molds and of associated mechanisms of the machine.

A further object of the invention is to provide improved mechanism for severing the connecting glass between charges of glass in the parison forming molds of the machine and the supply body of molten glass and for subsequently cutting off any excess glass below or at the open ends of the charged molds, thereby permitting part of the glass that has been drawn into each of said molds to sag or be expelled therefrom.

A further object of the invention is the provision in a glassware fabricating machine of the type having molds which are charged from a gathering pool by suction, of an improved means for preventing accumulation of chilled glass or scum at the gathering station at the surface of the pool.

A further object of the invention is the provision in a machine of the character described of a means for collecting and disposing of the excess glass that has been separated from the glass in the charged molds without interfering with proper temperature conditions in the glass at the gathering station.

A still further object of the invention is the provision in a machine of the character described of improved means for confining heat in the space above the gathering pool in the intervals between successive glass gathering operations.

A further object of the invention is the provision in a machine of the character described of a novel arrangement for supporting and operating the blow molds in which the glass parisons are blown to final form, whereby each of such blow molds and its associate mechanism comprises a separate unit which may be removed when desired for the replacement or repair of any of the parts thereof.

A further object of the invention is the provision in a machine of the character described of a novel mechanism for simultaneously transferring parisons from a plurality of parison molds to a like number of final blow molds and at the same time transferring articles of glassware from the final blow molds to a conveyor or like device for conducting such articles to a leer or leer loading mechanism.

A further object of the invention is the provision in a machine of the character described of an improved arrangement for supporting and operating a conveyor for removing the fabricated articles of glassware, whereby such conveyor may be operated to conduct the articles of glassware in opposite directions from the machine at different times.

A further object of the invention is the provision of a glassware fabricating machine of the character described in which all parts that are exposed or subjected to heat will be adequately cooled at all times.

A still further object of the invention is the provision of a glassware fabricating machine of compact form and relatively simple construction, but which will afford facilities for the fabrication of articles of hollow glassware at a relatively rapid rate and in an economical and efficient manner.

Other objects and advantages of the invention will become apparent from the following description, when such description is considered in conjunction with the accompanying drawings, in which:

Figure 1 is a view, mainly in side elevation and partly in vertical section, showing a glassware fabricating machine embodying the invention in operative position with respect to a gathering pool of molten glass, the view showing in full lines one of the parison or blank molds after it has been moved outwardly from its glass gathering position and showing in dot and dash lines both the glass gathering position and the parison transfer position of such mold;

Fig. 2 is a plan view of the improved machine, with portions broken away to show underlying parts which otherwise would be hidden;

Fig. 3 is a horizontal section through the machine, substantially along the line 3—3 of Fig. 1, with portions broken away and other parts being omitted, the view showing one of the blow mold units and a fragmentary portion of another, the remaining blow mold units being omitted to afford a view of mechanism which otherwise would be hidden thereby and to prevent unnecessary repetition of like parts;

Fig. 4 is a fragmentary vertical section through a lower corner portion of the machine, showing a portion of the glassware conveyor and supporting and driving mechanism therefor;

Fig. 5 is a fragmentary plan view of one of the final blow molds and its supporting and operating mechanism, showing the body of the individual housing for such mechanism and passages for conducting cooling air to the mold walls;

Fig. 6 is a relatively enlarged vertical section through a blow mold unit and its supporting plate, the view being substantially along the line 6—6 of Fig. 3;

Fig. 7 is a fragmentary perspective view of the rearward end portion of the blow mold unit and its associate supporting, guiding and locating mechanism;

Fig. 8 is a view partly in side elevation and partly in vertical section, showing the improved movable closure or heat confining cover for the space above the glass of the gathering pool and operating mechanism therefor, the view also showing certain parts carried by and adjacent to the closure;

Fig. 11 is a plan view of the improved glass severing and excess glass collecting mechanism of the machine, certain of the supporting and operating parts of such mechanism being shown in section;

Fig. 12 is a slightly enlarged sectional view taken along the line 12—12 of Fig. 11;

Fig. 13 is an enlarged plan view of a portion of the structure shown in Fig. 11;

Fig. 14 is a section along the line 14—14 of Fig. 13;

Fig. 15 is a section along the line 15—15 of Fig. 13;

Fig. 16 is a section along the line 16—16 of Fig. 15;

Fig. 17 is a section through the glass severing blades and the excess glass collecting cup of the mechanism shown in Fig. 11, but showing such parts closed instead of open as in Fig. 11;

Fig. 18 is a fragmentary elevation of the combined parison transfer and glassware takeout mechanism of the improved machine;

Fig. 19 is an end view of the structure shown in Fig. 18, the view being taken substantially along the line 19—19 of Fig. 18 and showing a parison being transferred to a blow mold and a blown article of glassware being delivered to the glassware conveyor.

Fig. 20 is an enlarged sectional view along the line 20—20 of Fig. 19;

Fig. 21 is a fragmentary view, mainly in elevation but partly in section, showing the parison transfer and article take-out mechanism in position to remove a parison from a parison mold and a blown article from the associate blow mold.

Fig. 26 is a diagrammatic view of the timing mechanism, air lines, and certain operating parts of the machine, portions of the latter having been broken away and other portions being shown in section.

General statement of the invention

Figures 9, 10:
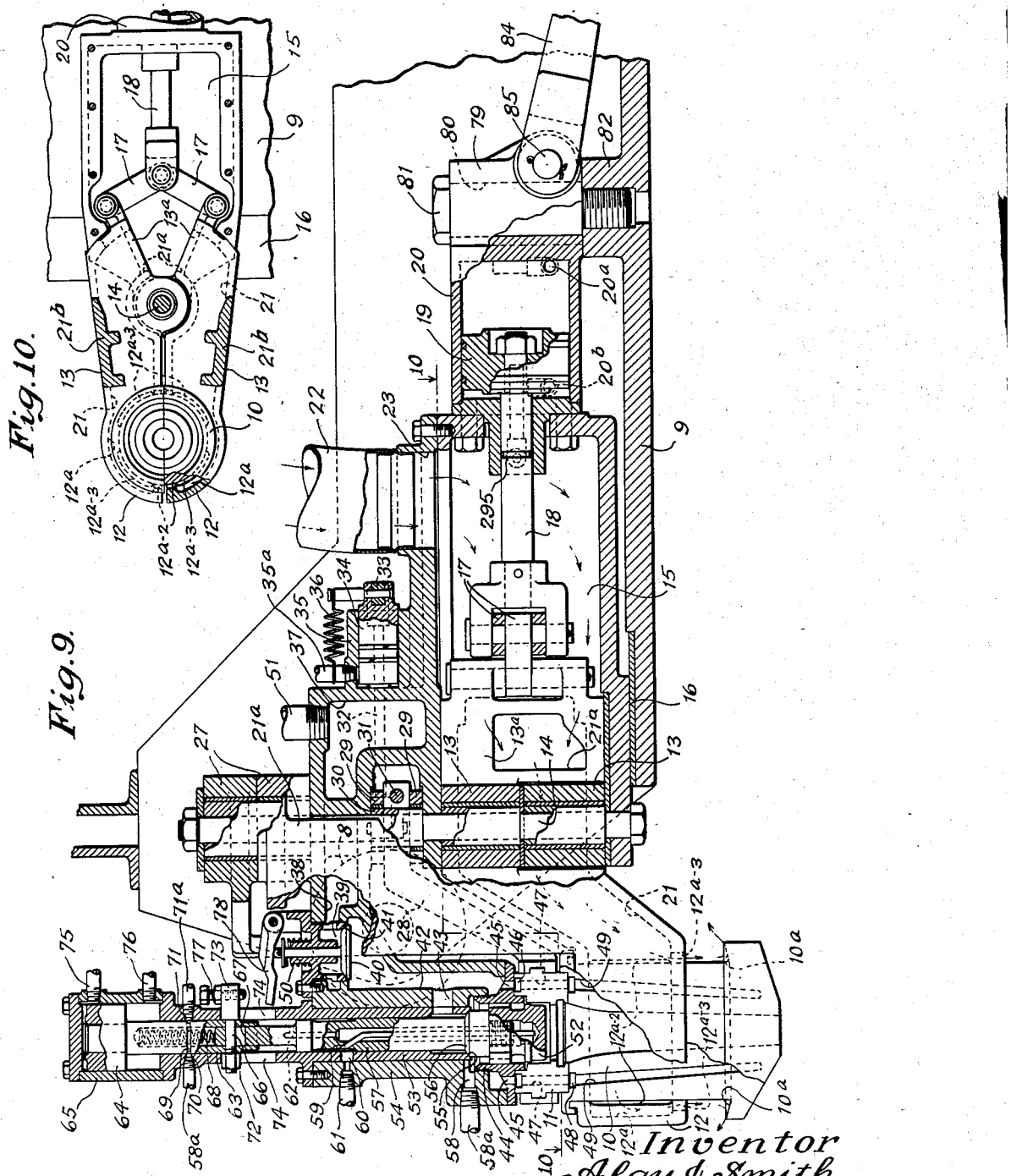
Fig. 9 is a relatively enlarged fragmentary view, partly in side elevation and partly in vertical section, showing one of the parison forming units including a parison mold and its operating mechanism.
Fig. 10 is a relatively reduced section substantially on the line 10—10 of Fig. 9.

According to the present invention, a plurality of parison or blank molds are moved simultaneously between glass gathering positions at the surface of a pool of molten glass and positioned over and in alignment with blow molds. I term the improved machine a "huddle machine" because the glass gathering and parison forming molds thereof are caused to move together or "huddle" as they are brought to their glass gathering positions, thereby permitting a relatively large number of molds to be charged simultaneously with glass from a gathering pool of a given size. These molds, when charged, are retracted from their glass gathering positions, being lifted sufficiently to clear the adjacent wall of the gathering pool container.

The connecting glass between the pool and the glass in each of the molds is severed at or near the beginning of the retractive movement of such mold. Some of the hotter and more fluid glass at the center line of the charged mold cavity may sag or run from the lower end of the mold or be expelled therefrom by a force, such as air pressure, applied to glass in the mold so as to provide for a bubble or axial cavity in the glass in the mold. The excess glass emerging or expelled from the lower end of the mold cavity may be temporarily collected or supported in a collecting cup and subsequently severed from the glass in the mold by the operation of a second shearing mechanism individual to each mold. When the separation of such excess glass has been effected, this cup may be opened and the excess glass dropped into a suitable cullet receptacle or chute.

The glass gathering and parison forming molds are moved apart during their travel from their gathering positions toward positions at which parisons may be transferred therefrom into underlying blow molds. Preferably, the transfer of the parisons from the parison molds to the blow molds is effected simultaneously with the transfer of fabricated articles of hollow glassware from the blow molds to a conveyor by which such articles may be conducted to a leer or leer loader. The transfer of parisons and take-out of fabricated articles are performed in an improved manner by improved mechanism. Articles are fabricated in the blow molds simultaneously with the production of parisons in the parison molds.

The operations hereinbefore described permit and promote rapid and economical fabrication and removal of articles of hollow glassware having walls of desirable and substantially uniform thickness.

After each charging of the parison molds and the removal of such molds from the gathering station, a refractory closure may be moved to position to confine heat within the space above the glass at the gathering station. This closure carries a skimmer blade, which, as the closure moves to its closed position, skims any chilled glass or scum from the glass gathering place and deposits the same glass at a place laterally of the glass gathering places.

The main frame structure

The improved machine may comprise a frame structure having a box-like lower or base portion 1, Figs. 1 and 3, mounted on wheels 2. Rails 3, Figs. 2 and 3, may be provided adjacent to a gathering pool container 4, Fig. 1, which may be an extension of a glass melting tank, not shown. The rails may be engaged by the wheels 2 so as to support the frame of the machine and the parts carried thereby in operative position with respect to the glass gathering pool, and so as to permit movement of the parts thus supported away from the gathering pool at any time such movement is desirable.

The base 1 of the frame structure has a horizontal top member 5, Figs. 1, 3 and 7, and is surmounted by upstanding side plates 6. These side plates 6 have their upper portions enlarged fore-and-aft, as indicated at 6a and 6b, Fig. 1. A cross or head plate 7, Figs. 1 and 2, connects the side plates 6 at a plane below the upper edges of the enlarged upper portion thereof and stays these side plates to each other as well as affording a support for certain parts of the machine, as hereinafter will be pointed out. The upper edge portions of the side plates 6 constitute rails 6c on which run wheels 8 of a carriage 9, the function of which will be hereinafter pointed out.

The box-like base 1 of the frame structure constitutes a housing in which many of the operating parts of the machine are disposed. The walls of this box-like base of the frame work may be provided with suitable openings or apertures as required to permit operative connections, suitably packed if desired, between these operating parts and mechanisms which are disposed outside of this housing. The walls of this housing may include suitable substantially airtight closures or removable sections, Fig. 3, to permit installation and removal and replacement of the parts which normally are disposed therewithin. The housing thus may be substantially air-tight for a purpose to be presently described.

The space between the side members 6, above the box-like base 1, is open at its ends and accommodates the finish blow mold units and certain operating mechanisms. The space above the top plate 7 accommodates certain operating parts of the machine. The carriage 9 which is movably supported on the rails 6c carries other parts of the machine.

The glass gathering and parison forming units and associate structure

The particular embodiment of the invention illustrated in the drawings includes five glass gathering and parison forming units (see Fig. 2). Each of such units includes a parison mold which preferably comprises a two-part body 10 and a two-part neck ring 11 (Figs. 1 and 9).

The parts or halves of the parison mold body are held in suitable holders 12 having arms 13 which are pivoted on a suitable vertically disposed pivot element 14, Figs. 9 and 10. The vertical pivot element 14 is carried by the bottom portion of a casing 15 which rests on a bearing plate or bearing portion 16 of the bottom wall of the aforesaid carriage 9. The arms 13 of the holders for the parison mold body halves have extensions or tail pieces 13a which are connected by links 17 with the stem 18 of a piston 19, Fig. 9. The piston 19 is reciprocable in a cylinder 20, to which the casing 15 is attached. Tubular conduits 20a and 20b are connected with the rearward and forward end portions of the cylinder 20 for supplying fluid pressure thereto to cause reciprocation of the piston 19. Thus, when the piston 19 is moved to the forward end of the cylinder 20, the halves of the parison mold body will be closed. The return movement of the piston 19 in the cylinder 20 will effect opening of the halves of the parison mold body, the arms 13 being swung apart about the axis of the pivot element 14.

The arms 13 are hollow and provide passages 21 which communicate at their inner ends through openings 21a with the interior of the casing 15. The passages 21 communicate at their outer ends with spaces 12a within the holders 12. The spaces 12a are open at the inner sides of the holders, next to the parison mold body halves, and the walls thereof have openings 12a—2 at the adjacent edges of the holders, and openings 12a—3 at the bottom edges of the holders. Cooling air may pass from the casing 15 through the passages 21, spaces 12a and the openings in the walls of the latter for cooling the walls of the parison mold body.

Upwardly facing air deflecting projections 10a at the lower ends of the halves of the parison body mold deflect upwardly cooling air from the openings 12a—3 to make for more efficient cooling of the mold and prevent such air from blowing upon the glass of the pool when the parison mold is above the latter. Air enters the casing 15 through suitable conduits 22 which connect a port 23 in the upper part of the casing 15 with a wind box 24 (see Fig. 1). The wind box 24 is mounted on a super-structure 25 on the carriage 9 and may receive its supply of cooling air under pressure through a flexible tubing 26.

The walls of the passages 21 also may serve to aid in supporting the parison mold halves firmly, being provided with upward extensions 21b having pivotal connections at 27, Fig. 9, with the upper end portion of the pivot element 14.

The halves of the neck ring 11 are carried by holders having arms, such as indicated at 28, Fig. 9. One of these arms has forks 29 pivotally mounted on a sleeve 30 to which the arm 28 of the other half of the neck ring is secured, as by the clamping arrangement indicated at 31. The sleeve 30 is mounted on a portion of the aforesaid vertical pivot pin 14.

Lugs on the arms 28 of the holders for the halves of the neck ring are suitably connected by rods 32, Figs. 2 and 9, with a cross head 33 at the outer end of the stem of a piston 34. The piston 34 is reciprocable in a cylinder 35. The cylinder is secured to or integral with walls of the casing 15. Air may be supplied to the inner end of the cylinder 35 through a tubular conduit 35a to force the piston 34 outward in the cylinder. This will cause opening of the halves of the neck ring. As soon as air pressure within the inner end portion of the cylinder has been relieved, a tension spring 36 will act to return the piston to the inner end of the cylinder, as shown in Fig. 9. This return movement of the piston will effect closing of the halves of the neck ring.

A chamber 37, Fig. 9, has walls secured to or formed integrally with the upper portion of the casing 15 and communicates through a passage 38 with a valve chamber 39. A valve 40 is adapted to coact with a valve seat 41 at the bottom of the valve chamber to control communication between the latter and a passage 42. The passage 42 communicates through a port 43 with the interior of a combined suction head and neck pin guide 44 and also communicates through ports 45 with semi-annular grooves 46 in the tops of the halves of the neck ring. The grooves 46 are in open communication with vertical leak grooves 47 between the meeting faces of the halves of the neck ring. The leak grooves 47 in turn are in communication with semi-annular grooves 48 in the tops of the halves of the parison mold body. The grooves 48 are in communication with leak grooves 49 between the meeting faces of the halves of the parison mold body. An expansion spring 50 tends to maintain the valve 40 against its seat 41.

The chamber 37 is connected, as by the conduit 51, with a source of sub-atmospheric pressure supply. When the valve 40 is moved downwardly from its seat, as may be done by mechanism to be presently described, a condition of sub-atmospheric pressure will be caused in the leak grooves of the halves of the closed parison mold body and closed neck ring and in the space in the neck ring between the neck pin 52 and the walls of the closed neck ring when the neck pin is in its downwardly projected position and the bottom of the mold is in contact with the surface of a supply pool of molten glass. This will tend to draw glass upwardly into the mold and around the neck pin. The operation of charging the mold in this manner will be further described in a subsequent portion of this specification.

The combined suction head and neck pin guide is shown as provided with an upstanding tubular casing comprising an inner tubular member 53 and an outer shell or housing 54 which may be integral with the walls of the passage 42. The walls of the passage 42 may in turn be integral with or secured to the walls of the chamber 37 so that all of such walls are carried by the casing 15. The lower end of the inner tube 53 constitutes a valve seat, indicated at 55, for an upwardly facing valve 56. The valve 56 is formed on the lower end portion of a stem 57 by which the aforesaid neck pin 52 is supported and moved vertically in the neck ring. When the stem 57 is in its raised position, as shown in Fig. 9, the valve 56 will abut the valve seat 55 for a purpose to be presently described. A port 58 communicates with the interior of the head 44 below the valve seat 55 and may be connected by a suitable tube 58a with a source of superatmospheric pressure supply so that blowing pressure may be applied to the glass in the parison mold after the suction through the neck ring has been discontinued. The purpose of this application of superatmospheric pressure will be presently pointed out.

The neck pin and its stem may be cooled, as by circulating a cooling fluid through the interior thereof. To this end, a tube 59 located in an axial space or bore in the stem and pin and open at its lower end, may communicate at its upper end through a port 60 with a supply tube 61, as shown in Fig. 9. Cooling fluid may be supplied from a source of supply through the tube 61, the port 60 and the tube 59 to the interior of the neck pin and neck pin stem, whence such cooling fluid may discharge to the atmosphere through a reduced passage 62.

The upper end portion of the stem 57 extends into a sleeve 63 which constitutes an extension of the stem of a piston 64. The piston 64 is reciprocable in a vertical cylinder 65 which is carried by the tubular member 53 at the upper end of the latter. A pin 66 extends through a slot 67 in the upper end portion of the stem 57 and through aligned openings in the sleeves 63 and connects the stem 57 loosely with the sleeve 63. That is, a slight amount of relative axial movement between the sleeve 63 and the stem 57 is permitted, the cross pin 66 then moving in the slot 67. An expansion spring 68 between the upper end of the stem 57 and a pocket in the upper end portion of the sleeve 63 tends to maintain the stem 57 constantly at the limit of its downward movement with respect to the sleeve 63. When in this position, a transverse passage 69 in the sleeve 63 establishes communication between ports 70 and 71 in the upper end of the tubular member 53. The port 70 is connected by the tube 58a with the port 58. The port 71 is connected with a superatmospheric pressure supply conduit 71a (see Fig. 26). Blowing pressure therefore cannot be applied through the neck ring to the glass in the parison mold until the neck pin has been retracted, as shown in Fig. 9. At this time, the valve 56 has been closed to prevent superatmospheric pressure from entering the leak grooves.

The opposite ends of the pin 66 protrude from the sleeve 63 and are provided with slide members, such as the nut 72 and the head 73, Fig. 9, adapted to slide in the vertical slots 74 in the opposite side walls of the tubular member 53. Thus, when air is admitted to the upper end of the cylinder 65, as through the tube 75, the downward movement of the piston 64 will be attended also by a downward movement of the stem 57 until the neck pin has reached the lower limit of its travel.

The further downward movement of the stem 63 may be employed to open the valve 40 in a manner to be presently described.

The head 73 carries a valve actuator, shown as an adjustable screw 77. When the stem 63 moves downwardly after the downward movement of the neck pin has ceased, this actuator 77 will strike a tappet lever 78 and open the valve 40. This will establish communication between the sub-atmospheric pressure in the chamber 37 and the space within the passage 42, port 43 and interior of the tubular member 53 above the valve 56. The downward movement of the stem 57 has moved the valve 56 from its seat 55 so that sub-atmospheric pressure will be communicated through the lower end of the tubular member 53 to the space within the neck ring around the lowered neck pin.

For the return or upward movement of the piston in the cylinder 65, air pressure in the upper part of the cylinder may be relieved. The spring 68 then will move the piston 64, the stem 63 and the actuator 77 upward sufficiently to permit closing of the valve 40. Air then may be admitted to the lower end of the cylinder 65 and the sleeve 63 and the stem 57 will move upward as a unit to retract the neck pin and close the valve 56.

The movable supporting structure of each of the glass gathering and parison forming units just described is provided with a hub 79 having a vertical bore 80, as shown best in Fig. 9. This hub 79 may be formed integrally with the outer head of the cylinder 20, which in turn is rigidly secured to and actuates the casing 15, as hereinbefore has been stated. A pivot bolt 81 is provided to connect the hub 79 of each of these glass gathering or parison forming units with an upstanding boss 82 on the carriage 9, substantially as shown in Fig. 9, but with the respective units spaced across the carriage substantially as shown in Fig. 2. When five glass gathering and parison forming units are employed, as shown in Fig. 2, the middle unit is prevented from swinging horizontally about the axis of the pivot bolt 81 on the carriage 9, in any suitable known manner, as by means of retaining pins 83 which may be secured in the carriage 9 at opposite sides of the casing 15 of the middle unit, as shown in Fig. 2. The connection of the movable supporting structure of the other units with the pins 81 are of such character as to permit these units to swing on the bearing plates 16 about the axes of the respective pivot bolts 81 within limits which are determined by mechanism which will now be described.

The horizontal oscillatory movements of the glass gathering and parison forming units, except the middle unit, about the axes of their respective pivot bolts 81, are occasioned and controlled by steering members or rudders 84, Fig. 2, which have their forward ends connected by horizontal pivot pins 85 with the hubs 79 of the associate units and are provided at their rearward ends with rollers 86 which run in cam grooves 87. The arrangement is such that the parison mold carrying ends of the units will be moved close together when they approach glass gathering positions over the gathering pool and will be spread apart and respectively disposed above and in vertical alignment with their associate blow molds when they have been retracted rearwardly to the parison transfer stations. The rollers 86 may have slight lateral play in the grooves 87 until they approach the end portions of the track which coact with the rollers and the steering members 84 to dispose the parison molds directly above and in alignment with the blow molds. These latter portions of the grooves include pivoted sides or sections 87a which are urged by springs 88 on guide rods 89 toward the opposite side walls of the cam grooves and thus tend to prevent any lateral play of the rollers when the latter are in the outer end portions of the grooves. When the rollers are held by the movable side walls of the grooves against opposing fixed side walls of the outer end portions of the grooves, the parison molds will be retained in exact vertical alignment with the underlying blow molds. Adjustable nuts 90 on the rods 89 limit the throw of the rail sections 87a toward the opposite side walls of the grooves and provide for close confinement of the rollers 86 between the opposite movable and fixed side walls of the grooves without causing any binding action on the rollers.

Mechanism for effecting periodic movements of the glass gathering and parison forming molds between their glass gathering positions and the parison transfer positions will now be described. Such mechanism may include a cylinder 91 supported on the carriage 9, substantially as shown in Figs. 1 and 2. A piston 92 within the cylinder 91 has a stem connected by a suitable coupling connection 93 with one end of a connecting rod 94, the opposite end of which is connected pivotally at 95 with a crank 96 on a driven shaft 97. The shaft 97 is the element of a driving mechanism which is designated generally as D. This driving mechanism is of such character as to cause a dwell after each 180° of rotation of the shaft 97. The particular driving mechanism will be hereinafter described in greater detail. It is sufficient at this point to point out that the arrangement is such that the throw of the crank 96 will cause the carriage 9 and the parts carried thereby to be moved to positions to dispose the glass gathering and parison forming units substantially in the positions indicated by the full line showing in Figs. 1, 2, and 26 when the crank arm 96 has completed a swinging movement of 180° to reach the position shown in Figs. 1 and 26. If air is now supplied to the forward end of the cylinder 91, as by the tubular conduit 91a, the movement of the cylinder 91 and the carriage as a unit with respect to the piston 92 will cause further movement of the carriage toward the gathering pool and away from the driving mechanism D. During this further movement of the carriage, the forward wheels 8 of such carriage will run down the inclined outer end portions 98 of the rails 6c, Figs. 1 and 26, substantially to position indicated by the dot and dash lines in Fig. 1; and will cause the glass gathering and parison forming molds to dip into contact with the surface of the molten glass in the gathering pool 99. If air is now supplied to the rearward end of the cylinder 91, as by a tubular conduit 91b, and exhausted or permitted to discharge from the forward end of such cylinder, the consequent movement of the cylinder and carriage 9 relative to the piston 92 will cause the outer end wheels 8 of the carriage to ascend the inclined track sections 98 and will lift the charged molds out of contact with the glass of the pool and return them to the positions indicated by the full lines in Figs. 1 and 2.

It is to be understood that by the time the glass gathering and parison forming molds have been dipped to their glass gathering positions, the molds will have been closed and neck pins will have been lowered by mechanisms such as hereinbefore have been described. Sub-atmospheric pressure will be caused in the neck ring, and glass will be drawn into such molds. The valve 40 then may be closed, after which the neck pins may be raised and the valves 56 closed. If, subsequent to this lifting of the neck pin and closing of the valve 56, superatmospheric pressure is applied through the port 58 to the interior of the neck ring, the aperture or cavity left by the lifting of the neck pin may be enlarged and a bubble may be formed in the glass in the mold. This may be attended by expulsion or sagging of relatively hot glass from the open lower end of the mold. The separation of the glass in the molds from the glass supply and from any excess glass will be effected by improved severing mechanism which will hereinafter be described.

The valve controlling the hereinbefore described line for conducting superatmospheric pressure to the port 58 may then be opened to provide a vent for such pressure.

Assuming now that the movement of the piston 92 in the cylinder 91 has returned the charged molds to the positions shown by the full lines in Figs. 1 and 2 and also shown in Fig. 26, a throw of the crank arm 96 through 180° from the position shown in these figures will cause the carriage 9 and the parts carried thereby, including the molds, to be moved rearwardly in a substantially horizontal plane to positions over the blow molds. These are the parison transfer positions of the glass gathering and parison forming units. The drive mechanism D will function to cause a dwell of the carriage when it has reached the end of its retractive movement so that the parison molds will be maintained temporarily stationary over the respective blow molds, which are shown in dotted lines in Fig. 2. An adjustable stop 91s, Figs. 1 and 26, limits the forward throw of the cylinder 91 relatively to the piston 92 and may be adjusted to vary within limits the glass gathering positions of the molds 10. The connecting rod 94 may be adjusted as to length to insure accurate alignment of the parison molds with the underlying blow molds when the parison molds are in their retracted positions.

Glass severing and excess glass collecting mechanisms

Reference now is made more particularly to Figs. 1, 15 to 17 inc., and 26. The novel glass severing mechanism comprises two separately acting independently timed glass cutting devices for each glass gathering and parison forming unit. One of these glass cutting devices is designed, intended and operated to sever the connecting glass between the glass in the mold and the glass of the gathering pool when the charged mold has been lifted out of contact with the surface of the pool. The second glass cutting device is designed to sever cleanly from the glass in the mold any excess glass which may have sagged from the mold cavity or have been expelled therefrom, as to permit the formation of a bubble in the glass in the mold.

The glass severing devices for the bank of glass gathering and parison forming units may be carried on a substantially horizontal edgewise swingable plate 100 which is suspended from outstanding studs 102 on brackets 103, as by the pivoted parallel links 101. The brackets 103 may be secured to the side members of the main frame structure, such connection of one of the brackets being shown clearly in Fig. 1 and the other bracket being shown in Fig. 2.

Blades 105 are pivoted on a stud 106 carried by a block 507 which is slidable in a guideway 508 in the box-like frame 104. A spring 109, carried by the top of the frame 104, has forks 109a bearing upon the shear blades 105 at opposite sides of the pivot stud 106. Fixed pivot pins 110 are upstanding from the top of the frame structure 104 in position to engage with lateral notches 111 in the outer side edges of the shear blades 105. When the slide block 507 is moved in its guideway toward an upstanding rib 112 at the rear edge of the plate 100, the pivot pin 106 will likewise be moved toward the rib 112 and the coaction of the walls of the notches 111 with the pivot pins 110 will cause closing of the blades 105. A return movement of the slide block 507 in its guideway will cause opening of the blades 105.

For simultaneously opening and simultaneously closing the respective pairs of blades 105 for the several glass gathering and parison forming units, mechanism substantially as follows may be employed.

A rock shaft 113 is journaled in lugs 114 on the bottom of the plate 100 and is provided with a rocker arm 115 connected by a link 116 with a piston 117 in a cylinder 118. The cylinder 118 may be secured to one end portion of the plate 100. The arm 115 extends through a suitable aperture in the plate 100 for connection with the links 116 when the cylinder and piston are disposed above the plate 100 and the rod 113 is disposed beneath the plate 100, as shown. A second upstanding rocker arm on the rock shaft 113, indicated at 119 in Figs. 11, 12 and 26, is shown as extending through a suitable aperture in the plate 100 and as being connected by a tension spring 120 with a pin on the cylinder 118. A slide block actuating lug 121 is provided for each of the slide blocks 507. Such lug is loosely mounted on the rock shaft 113 and extends through suitable apertures in a plate 100 and the bottom of the associate frame 104 so that a rounded upper end portion of the lug may enter and engage with a notch or recess 122 in the bottom of the associate slide block. A torsion spring 123 connects the hub of each lug 121 with the rock shaft 113 and tends to urge such lug angularly about the rock shaft until a laterally projecting pin 124, carried by the hub portion of such lug, bears against a lip 125 on a collar 126. The collar 126 is pinned to the rock shaft 113 as shown in Fig. 16. The arrangement is such that when the piston 117 is moved outward in the cylinder 118 from the position shown in Fig. 11, the rocking of the shaft 113 and the angular turning movement of the collars 126 with such shaft will permit the torsion springs 123 to swing the slide blocks 507 as required to effect closing of the shear blades 105. The outward movement of the piston 117 may be effected by air pressure, supplied to the cylinder through the tubular conduit 118a. When air has been exhausted from the inner end of the cylinder 118, the spring 120 will act to rock the shaft 113 and the respective collars 126 as required to cause return sliding movements of the block 507 and opening of the shear blades 105. An adjustable stop 115a, Figs. 11 and 12, limits the outward movement of the piston 117 and the closing movement of the blades 105.

Beneath each pair of blades 105 are the cup sections 107 and 108. The cup section 108 has a stem or shank 127 which is disposed against one side of the associate frame 104 and is fixedly secured thereto, as by the screws 128, Figs. 13 and 15. The section 107 of the two-part cup has a shank 129 pivoted intermediate its length on a vertical pivot element 130, Figs. 13 and 16. The pivot element 130 is carried by the box-like frame member 104. The outer end of the shank 129 is provided with an upstanding stud 131 which protrudes into a cutaway portion or longitudinal slot 132 in a slide bar 133. A spring pressed plunger 134 tends to confine the upper end of each stud 131 against one end of the slot 132. The plunger has a stem 135 slidable in the bore of a retaining block 136 in the opposite end portion of the slot 132. The slide bar 133 extends across the box-like frame members 104 in suitable slots 137 in the upper walls of such frame members, being held against displacement by the upstanding rib flange 112 on the plate 100 and by retaining and guiding members 138 which are carried by such plate. One end portion of the bar 133 is offset laterally as shown at 139, and is connected by a loose pivotal connection with a piston 140 in a cylinder 141. The cylinder 141 is secured on the plate 100 at the end of the latter opposite that on which the cylinder 118 is supported. When air is supplied to the closed end of the cylinder 141 as by the tube 141a, the outward movement of the piston in the cylinder will cause longitudinal sliding movement of the bar 133. This in turn will communicate movement through the spring pressed plungers 134 to the studs 131 on the shanks of the pivoted cup sections 107 and will swing the sections 107 toward the fixed sections 108, as required to effect closing of the cups. A tension spring 142 connects a fixed projection 143 on the bar 133 with the plate 100 and functions to return the piston 140 to the inner end of the cylinder 141 when air pressure in the latter has been relieved. This will cause swinging movement of the sections 107 as required to open the glass collecting cups.

The bottoms of the cup sections 107 and 108 carry cooperative shear blades 400 and 401, respectively, in positions to be closed and opened by the closing and opening movements of the cup section 107. The blade 401 may be secured to the bottom of the cup section 108 by screws which pass through slots in the shear blade into threaded openings in the cup section bottom, as indicated by the screw 402 and slot 403 in Fig. 17. The blade 401 may be adjusted edgewise on the bottom of the cup section 108 by the screws 404, Figs. 13, 15, and 17, when the screws 402 have been loosened. The blade 400 is held against the bottom of the cup section 107 and in close shearing contact with the blade 401 (when the blades 400 and 401 are closed) by springs 405. Guiding studs, such as that indicated at 406 in Fig. 17, project from the bottom of the cup section 107 into slots, such as that indicated at 407 in Fig. 17, and cooperate with the springs 405 to retain the blade 400 on the bottom of the cup section 107 while permitting limited edgewise adjustment of the blade by the adjusting screws 408.

The cup sections 107 and 108 may have water jackets 409 and 410, respectively, to which water may be supplied by tubes 411 and 412 and from which water may discharge through the tubes 413 and 414, respectively. Water from the tubes 413 and 414 drips onto the drain pan 415.

The plate 100 and the parts carried thereby may be swung from the full line position of Fig. 1 to the dot and dash line position of the same view by mechanism which may include a cylinder 144, a piston rod 145, and a connecting rod 146 having one end portion thereof pivotally connected at 147 with one of the parallel links 101 and its opposite end portion connected by linkage 148 with the piston rod 145. The linkage 148 may be pivotally supported by a swingable rocker arm 149 on a rock shaft 149a. The latter may extend transversely through the main frame structure and the opposite end thereof operatively connected, as in the manner just described, with one of the links 101 at that side of the machine. Air supplied to the rearward end of the cylinder 144 by the tubular conduit 144a will actuate the piston therein as required to swing the plate 100 and the parts thereon to the full line position of Fig. 1. A spring 150 may connect the pivoted member 149 with the frame structure and function to return the piston within the cylinder 144 on relief of pressure at the rearward end of the latter. This will cause movement of the plate 100 and of the parts thereon to the dot and dash line position of Fig. 1.

The operation of the improved severing mechanisms and of the excess glass collecting cup may be substantially as follows. The shear blades 400—401 and the cup sections 107—108 may be closed by the mechanism described as soon as the molds 10 have been raised sufficiently far from the pool and retracted a sufficient distance to present the connecting glass to the blades 400—401. The closing of these blades will effect severance of the connecting glass between the charged molds and the glass of the pool.

The closed cup will support and collect any excess glass between the plane of severance and the bottom of the mold 10. Such excess glass may comprise relatively hot and fluid glass that has sagged from the associate mold 10 or has been expelled therefrom for the purpose hereinbefore pointed out.

The blades 105 may be closed at a predetermined appropriate time to sever the excess glass cleanly at the lower ends of the mold cavities. The cup sections may be opened to drop the collected glass into a hopper 151 at the upper end of the chute 152, whereby such excess glass may be delivered to a suitable cullet receptacle. The walls of the hopper 151 may be provided with a nozzle, such as indicated at 153, from which jets of water may be discharged onto the walls of the hopper 151 and onto the glass dropping from the cup into the hopper. Water from the drain pan 415 also may fall into the hopper 151.

The movements of the swingable carrier for the cup and the severing devices and the operations of these parts may be timed with relation to the operations of associate parts of the machine, particularly of the glass gathering and parison forming molds, to produce the most satisfactory results under given conditions. Many variations in the relative times of these operations may be effected.

*The gathering pool closure, skimmer and their operating mechanisms*

As shown in Figs. 1 and 8, the walls of the extension 4 in which the gathering pool of molten glass is located are formed so as to provide an opening in the top walls of the extension above part of the glass of the gathering pool. The glass gathering and parison forming molds are dipped through this opening into contact with the glass pool for the glass gathering operations, as hereinbefore has been described. It is desirable that the opening above the glass gathering pool should be closed between glass gathering operations so as to confine heat against the surface of the glass and to permit better and more accurate control of the temperature of the glass at the gathering points. To this end, the improved machine may include a closure 154, Figs. 1 and 8, and mechanism for moving this closure to the closed position shown in Fig. 8 in the intervals between successive glass gathering operations and to an open position substantially as shown in Fig. 1 at the proper times to permit such glass gathering operations.

The closure 154 may comprise a holder 155 of plate-like form, see Fig. 2, on the under side of which refractory blocks are mounted and secured in place in any suitable manner. The holder 155 is suspended from a shaft 156 by supporting arms 157. The shaft 156 is journaled in bearings 158 which may be carried by brackets 159 secured to any convenient supporting structure, as to the uprights 160, Figs. 1, 2 and 8. A rocker arm 161 is secured to the shaft 156 and is operatively connected by a link 162 and a connecting rod 163 with a crank arm 164 on a driven shaft 165, Fig. 8. The extending end portion of the rocker arm 161 may be provided with counterweights 166.

The shaft 165 is the driven shaft of a drive mechanism, generally designated D—1. This drive mechanism includes a prime mover, such as the motor 167, and an intermittent motion transmitting mechanism, indicated generally at 168, for translating the rotary movements of the motor shaft into intermittent rotary movements of the driven shaft. Each of such intermittent rotary movements of the driven shaft is through 180°. The details of construction of the intermittent motion transmitting mechanism between the motor and the driven shaft will hereinafter be described more in detail. It is sufficient at this point to state that the driving mechanism D—1 will rock the arm 161 periodically to raise the closure 154 from the position shown in Fig. 8 substantially to the position shown in Fig. 1 and will further rock the arm 161 periodically, as the driven shaft completes the second half of a complete cycle of rotation, to return the closure 154 from the open position of Fig. 1 to the closed position of Fig. 8. These swinging movements of the closure 154 are timed by mechanism which hereinafter will be pointed out to occur at the proper times with relation to the movements of the glass gathering and parison forming molds to and from their glass gathering positions.

The driving mechanism D—1 may be mounted on any suitable supporting structure, such as the horizontal frame work indicated at 169, Fig. 8.

It is desirable to remove any chilled glass or scum from the surface of the gathering pool at the gathering points after each glass gathering operation. A skimmer blade for effecting such removal of the surface glass at the gathering points is indicated at 170, Figs. 1, 2 and 8, and is shown as being mounted on the plate 155 of the gathering pool closure. This skimmer blade 170 is slidable edgewise on the plate 155 beneath guiding and retaining blocks 171 and may be moved between a position at which the edge of the blade is disposed a considerable distance beyond the adjacent end of the closure 154, as shown in Fig. 1, and a position in which the edge of the skimmer blade has been retracted nearly to the plane of the adjacent edge of the closure 154, as shown in Fig. 8. The skimmer blade 170 preferably is formed with an internal cooling chamber through which water may be circulated, as by the pipes 170—x, Fig. 2.

Mechanism for reciprocating the skimmer blade in this manner may comprise levers 172, Fig. 2, fulcrumed intermediate their ends at 173 on the plate 155 and having their outer ends connected by links 174 with rearwardly extending ears 175 on the skimmer blade. The inner ends of the levers 172 are operatively connected with a head 176 on the rod of a piston 177 which is reciprocable in the cylinder 177a. Tension springs 178 connect the outer end portions of the levers 172 with the plate 155 and tend to maintain the skimmer blade 170 in the retracted position shown in Fig. 8. The springs also will tend to maintain the piston 177 at the forward end of the cylinder 177a.

However, when air under pressure is admitted to the forward end of the cylinder 177a, as through the pipe 179, the consequent rearward movement of the piston 177 will actuate the levers 172 against the action of the springs 178 as required to project the skimmer blade 170 forwardly to the position shown in Fig. 1. This projection of the skimmer blade is timed, by mechanism to be hereinafter referred to, to take place at or about the time the closure 154 begins its movement from the Fig. 1 position to its closed position. The projected skimmer blade will skim the surface glass from the pool at the places at which the molds 10 had dipped into contact with the pool for the gathering operations. Before or by the time the closure 154 reaches the position shown in Fig. 8, the skimmer blade will have been moved out of contact with the glass of the pool and retracted, leaving the glass that has been pushed ahead of it in a zone that is outside of the gathering zone. The skimming of the glass at the gathering station in this manner will cause fresh glass of the proper temperature to be presented to the molds for each gathering operation.

As is indicated in Fig. 1, the bath of glass at the gathering zone is of substantial depth. The forward portions of the glass basin comprise relatively thick walls, and these walls may, if desired, be insulated. The combination of the relatively deep bath and the maintenance of proper heat conditions in the extreme forward portion of the bath cause a circulation of the colder glass pushed forward by the skimmer downwardly into the bath adjacent the front wall, and thence back at a lower level into the tank where the chilled glass is reconditioned before it rises again to the surface and approaches a gathering point.

If desired, additional mechanical or other aids known per se in the art may be employed to effect or aid in the circulation above mentioned, and to assure the complete removal of all chilled glass from the zone of gathering between gathering operations and the reconditioning of such chilled glass before it again approaches the gathering zone.

*The blow mold units and their supporting structure*

A blow mold unit is provided for each glass gathering and parison forming unit. Each blow mold unit comprises a box-like casing 180, Figs. 1, 3 and 5 to 7 incl., including a removable top 181. The bottom of the frame 180 has front and rear depending lugs 182, Figs. 1, 6 and 7, slidable in a fore-and-aft groove or guideway 183 in the supporting plate 5 of the main frame structure.

The casing 180 is open at its forward end. The bottom thereof is provided adjacent to its forward end with an upstanding pivot element 184, Fig. 5, on which are mounted the arms 185 of the holders for the halves of a two-part blow mold 186. Levers 187, fulcrumed at 188 on the bottom of the frame 180, have their forward ends connected by links 189 with the holders 185 and have their rearward ends connected by links 190 with a cross head 191 on a piston rod 192. The piston rod 192 is carried by a piston 193 in a cylinder 194. The cylinder 194 is secured to the rearward end of the frame 180. As best seen in Fig. 5, the arms 185 have arcuate edge portions 195 fitting closely, although slidably, within in arcuate guides 196 at the sides of the frame 180, thereby assuring smooth opening and closing movements of the halves of the blow mold.

When air is admitted to the rearward end of the cylinder 194, as through the pipe 197, the forward movement of the piston in the cylinder will cause the halves of the blow mold to close. Admission of pressure fluid to the front end of the cylinder 193, as through the pipe 198, will cause opening of the halves of the blow mold.

A blow head 199 for each blow mold is carried on an arm 200 which is loosely mounted on a shaft 201 carried by the forward end of the casing 180. A second arm 202, which also is mounted on the shaft 201, has its outer end apertured loosely to receive bolts 203 which are carried at the outer end of the arm 200. Springs 204 encircle the bolts 203 between the outer ends of the arms 200 and 202 and yieldingly maintain these arms in a given angular relation. The arm 202 has a cam plate 205 with which a roll 206 on a rock arm 207 is in contact. The rock arm 207 is feathered to a rock shaft 208 which extends transversely of the main frame structure and is partially shown in Figs. 1 and 2.

Mechanism for rocking the rock shaft 208 angularly about its axis comprises a cylinder 209, a piston 210 reciprocable in the cylinder 209, a piston rod 211, and a link 212 connecting a head on the outer end of the piston rod 211 with a rocker arm 213 on the shaft 208. When fluid pressure is admitted to the rearward end of the cylinder 209, as through the pipe 214, the forward movement of the piston rod will actuate the rock shaft 208 through the connections described so as to swing the rock arm 207 upwardly and thereby to cause the arms 202 and 201 to swing forwardly and downwardly to dispose the blow head 199 in operative relation with the closed blow mold (see Fig. 1). A tension spring 215 maintains the cam plate 205 of the arm 202 against the roll 206 and will retract the arms 200 and 202 and the blow head upwardly and rearwardly as soon as the engagement of the cam roll 206 with the cam plate 205 will permit. This upward and rearward retraction of the blow head may take place when pressure fluid has been admitted to the forward end of the cylinder 209, as through the pipe 216, and has been relieved from the rearward end of the cylinder 209. The consequent rocking movement of the shaft 208 about its axis will swing the arm 207 downwardly and rearwardly, permitting the spring 215 to function in the manner above described. Blowing pressure may be supplied to the head 199 by a tubular conduit 199a. The time of application of such blowing pressure may be determined by the operation of adjustable timing mechanism of the machine.

A bottom plate for each blow mold is indicated at 217, Fig. 1, and is shown as being carried by an arm 218 which is swingingly supported by a transverse pivot element or shaft 219 on the forward end of the casing 180. This arm 218 has a cam surface 220 resting on a roll 221 on a reciprocable non-circular rod 222. The rod 222 is slidable in aligned openings in the front and rear lugs 182, Figs. 1, 6 and 7.

Mechanism for reciprocating the rod 222 of each unit, as required to raise bottom plate 217 to the position shown in Fig. 1 at the proper time and to permit the bottom plate to swing downwardly and rearwardly away from the bottom of the blow mold at the proper time, may comprise the following parts. An expansion spring 223 encircles the rod 222 between the rear lug 182 and an adjustable stop, shown as a washer 224. The spring 223 thus tends to urge the rod 222 forward to the position shown in Fig. 1. A laterally projecting pin 225 at the rearward end of the rod 222, Figs. 3 and 7, thus will be maintained constantly against an upwardly and forwardly projecting lug 226 on a rock shaft 227, which extends transversely of the main frame structure, as shown in Fig. 3. This shaft 227 may be rocked about its axis periodically to swing the lugs 226 rearwardly and thereby to slide the rod 222 rearwardly against the action of the spring 223, as required to permit downward and rearward swinging movement of the bottom plate 217. This rocking movement of the shaft 227 may be effected by admitting pressure fluid, as through the pipe 228, to the forward end of the cylinder 229 which is secured to a side member 6 of the main frame structure. A piston 230 in the cylinder 229 has its rod operatively connected with a rocker arm 231 on the rock shaft 227. An adjustable stop 222a, Fig. 7, on the rod 222, will contact with a depending lug 194a on the head of the cylinder 194 and will limit the forward spring actuated movement of the rod 222.

The bank of blow molds, supported and mounted as just described, is disposed in the proper position on the supporting plate 5 so that each blow mold will be in alignment with the corresponding glass gathering and parison mold when the latter is at its transfer station. This is indicated by the showing of these molds in Figs. 1 and 2. Should it be desired to replace or repair any part of a particular blow mold unit, the entire unit may be removed simply by loosening the connection between the rocker arm 207 and the rock shaft 208 sufficiently to permit such rocker arm to be slid laterally on the shaft 208 out of contact with the cam plate 205 of the associate arm 202 and out of the plane of the latter. This may be done by loosening one of the collars which are shown in Fig. 3 at the sides of the hub of the arm 207. The casing 180 then may be grasped and slid rearwardly, carrying with it the blow mold, the blow head, the bottom plate and the operating mechanisms for these parts. The engagement of the lugs 182 with the walls of the groove 183 will guide movements of the casing 180 on the plate 5 when a blow mold unit is removed and also will guide the frame to the proper position on the supporting plate 5 when the blow mold unit is replaced. A locking pin 416, carried by a bracket on the rearward end of the casing 180, may engage with a socket or opening 417 in the supporting plate 5, when the casing of that blow mold unit is in the exact position desired on the supporting plate. This is shown best in Fig. 7. This locking pin also will prevent accidental displacement of its blow mold unit.

As best seen in Fig. 5, the arms and holders for the halves of the blow mold of each blow mold unit may be hollow to provide passages 418 for cooling air. These passages may have vents, such as that indicated at 419. For supplying cooling fluid to the passages, openings 420 may be provided in the plate 5 for registration with openings 421 in the bottom of each casing 180 when the latter is in its operative position (see Figs. 3 and 6). Except for the openings 420, the supporting frame structure below the plate 5 may be substantially air tight, as hereinbefore has been pointed out. Cooling air may be admitted thereto from any convenient source of supply and will pass therefrom through the registering openings 420—421 into the casings 180 and thence to the cooling passages of the respective blow mold units.

The parison transfer and glass takeout mechanism

The machine includes mechanism for taking parisons from the parison molds at the transfer station and finally blown articles of glassware from the blow molds simultaneously and for delivering the parisons to the blow molds and the articles of glassware to an associate conveyor. A combined parison transfer and glass takeout unit is provided for each set of parison and finish blow molds, and is shown to advantage in Figs. 1, 3, 18, 19 and 21.

The parison transfer and article takeout mechanism comprises a vertically movable supporting frame comprising a plate 232 extending between and secured to a pair of sleeves 233 which are slidable on the standards 234. The standards 234 may be carried by clamps 235. These clamps 235 may comprise part of the main frame structure or be secured thereto in any suitable known manner. Connecting rods or pitmen 236 have their upper ends operatively connected at 237 with the plate 232 and their lower ends operatively connected at 238 with crank arms 239 on shafts 240 and 241. Enmeshed gears 242 and 243 are secured to the shafts 240 and 241 respectively. The rotation of the gears 242 and 243 in the directions of the arrows of Fig. 18 and through 180° will cause an upward movement of the plate 232 and the parts carried thereby. The extent of this upward movement may be regulated by adjustment of the threaded connections at the opposite ends of the pitmen 236. Further rotary movements of the gears 242 and 243 through the second 180° of a complete revolution will return the plate 232 and the parts carried thereby to the positions shown in Fig. 18. These intermittent rotary movements of the gears 242 and 243 and of the shafts 240 and 241 through 180° are caused by a driving mechanism generally indicated at D—2 in Figs. 1, 3, 22 and 26. This driving mechanism, and the generally similar driving mechanisms D and D—1, hereinbefore referred to, will be hereinafter further described.

The respective sleeves 233 have horizontal bearings at their fronts, such as indicated at 244 in Fig. 3, for supporting a pair of vertically spaced horizontal slide rods, designated 245 and 246 respectively. Each of these rods 245 and 246 extend through horizontal aligned apertured ears at the rear of pairs of tong carrying members 247 and 248, respectively. A pair of the members 247 and 248 is provided for each set of vertically aligned parison and blow molds. The left hand member of each of these pairs of tong carrying members is secured to one of the slide rods while the other member of that pair of carriers is secured to the other rod. Thus, the members 247 are pinned to the lower rod 246, as by the pins 249, Fig. 18, while the members 248 are pinned to the upper rod 245, as at 250. When the rods 245 and 246 are slid rectilinearly in opposite directions, the members of each pair of carriers will be moved toward or away from each other, according to the directions of movements of the two rods 245 and 246. The purpose of these relative movements of the members of each pair of carriers will be presently pointed out.

The tops of the members 247 and 248 of each pair of carriers constitutes supports for pivoted holders 251 to which the members 252 of a pair of upper or parison transfer tongs are secured. With the particular arrangement shown in Figs. 18 to 21 inclusive, the rearward end portion of each holder 251 is pivotally secured to its carrier by a vertical pivot pin 253. A stud 254 depends from a projecting outer side portion of the holder 251 below the level of a horizontal flange 255 at the upper end of the carrier. A tension spring 256 connects the lower portion of the stud 254 with a pin 257 which depends from the flange 255. The inner end portion of the tong member 252 is secured firmly by the cap screws 258 to its holder. The action of the springs 256 will maintain the studs 254 against the outer side edges of the flanges 255 of the members of each pair of carriers and thus will tend to maintain the adjacent edges of the projecting ends of the members of each pair of tongs in position to grip a parison or article of glassware when the carriers 247 and 248 are in close juxtaposed relation, as shown in Fig. 18. The gripping action on these tongs on the article held will be firm but will be spring-effected and therefore yielding should there be an abnormal resistance to the closing movement of the tongs.

The lower end portions of the members 247 and 248 of each pair of carriers may be provided with vertical slots in their lower ends, as indicated at 259, Fig. 18, for the reception of tongue portions 260 of holders 261 for the lower or take-out tongs. Horizontal pivot pins 262 secure the tongue portions of the holders 261 to the slotted lower end portions of the carriers 247 and 248. These pivoted holders 261 carry the members 263 of a pair of article take-out tongs which are secured thereto, as by the screws 264, Fig. 19. When these tongs 263 are substantially horizontal, as shown by the full lines in Fig. 19, the rearward ends of the holders 261 will contact, as at 265, Fig. 19, with abutments or stops at the lower ends of the carriers 247 and 248. At this time, the members 263 of the article take-out tongs will rest on kick up lugs 266 which are carried by a rock shaft 267. The rock shaft 267 is journaled in bearings on collars 268 secured to the standards 234. As shown in the right hand portion of Fig. 18, and in Figs. 1 and 19, one of these kick up lugs 266 has an integral rearwardly extending tail piece 269, formed with an inclined cam surface 270. The adjacent tongs carrier, which is the tongs carrier 247 of the right hand pair of carriers shown in Fig. 18, has adjustably secured thereto an actuator plate 271 provided with a beveled lower edge 272 adapted to slide on and cooperate with the cam surface 270 of the member 269 to rock the shaft 267 in a counterclockwise direction, as viewed in Fig. 19, when the tongs carriers 247 and 248 have been moved downward to their lower positions and are moving apart to effect separation of the tongs. This rocking movement of the shaft 267 will cause all the kick up lugs 266 to tilt the opening members of each pair of article take-out tongs upwardly to the dot-and-dash line position of Fig. 19 so that the articles, such as that indicated at 273 in Figs. 1 and 19, which have been released by the tongs and are resting on a conveyor belt 274 in Fig. 1, may move with the latter without the tongs interfering with such movement.

Mechanism for opening the tongs at the proper times may comprise a cylinder 275, secured to the plate 232, Figs. 18 and 26. A piston 276 is reciprocable in this cylinder and has its stem connected by the horizontal pivot element 277 both with an ear 278 on the adjacent carrier 247 and to a link 279 that is connected to one end of a lever 280. The lever 280 is fulcrumed intermediate its length at 281 on the plate 232 and has its upper end connected by a link 282 to the adjacent carrier 248. A tension spring 283 connects the lower end portion of the lever 280 with the plate 232 and tends to maintain the piston 276 at the inner end of its movement in the cylinder 275. In this position of the piston in the cylinder, the members 247 and 248 of the pairs of carriers are in their adjacent positions and the tongs are closed. However, when air has been admitted to the inner end of the cylinder 275, as through the pipe 284, the outward movement of the piston in the cylinder will swing the lever 280 from the full line position of Fig. 18 to the dot-and-dash line position of the same view, or against an adjustable stop 285 on a bracket carried by the plate 232. This movement of the lever 280 will cause the particular carrier 248 to which the upper end of that lever is connected to be shifted to the right in Fig. 18. Since all of the carriers 248 are pinned to the rod 245, movement of one of them will cause a longitudinal shifting of the rod 245 and of all of the carriers 248 in the same direction. Coincidentally with this lateral shifting to the right of the members 248, the connection of the piston stem with the ear 278 on the adjacent member 247 will cause a shifting of that member to the left. The connection of this partciular member 247 with the rod 246 and of that rod with all the members 247 will cause a corresponding shifting movement of all the members 247. The members 247 and 248 of each pair of carriers thus will be separated. As soon as pressure in the inner end of the cylinder 275 has been relieved, the spring 283 will function to cause return shifting movements of the carriers 247 and 248 of each pair toward each other to effect closing of the members of the pairs of parison tongs and article take-out tongs.

The operations of the mechanisms for shifting the pairs of tongs vertically and for opening and closing the members of the respective pairs of tongs are timed suitably, as by mechanism such as hereinafter will be pointed out, with relation to various other operations of the machine and particularly with relation to the movements of the parison and blow molds and of the parts thereof. In Fig. 1, the full line view shows the lower or article take-out tongs in open position after they have released the finished article 273. The upper or parison transfer tongs are shown after they have opened and have released a parison that was brought by them to the blow mold. From the positions shown in Fig. 1, the opened parison transfer tongs may be moved upwardly through the opened halves of the overlying parison mold and closed to grasp a parison 422 that is at that time suspended from the neck ring of that parison mold, as shown in Fig. 21. Coincidentally with this upward movement and closing of the parison transfer tongs, the opened article take-out tongs will move upwardly between the halves of the overlying open blow mold and closed to grasp the neck of the blown article 273 which at that time is resting on the raised bottom plate 217. The downward movement of the tongs carriers, while the tongs are closed, will transfer parisons downward into the open blow molds, and the blown articles downward to the conveyor belt. The bottom plates 217 will be swung downwardly to permit the downward movement of the blown articles from the opened blow molds and then will be swung upwardly to receive the parisons which are being moved downwardly into the opened blow molds from the overlying parison molds. The molds parts will be opened and closed and the blow head 199 will be swung to and from its operative position as required to permit the above transfer and take-out operations and the formation of parisons and fabricated articles in the molds in the intervals between such transfer and take-out operations.

*The driving mechanisms D, D—1, and D—2*

These separate driving mechanisms have many features in common. As hereinbefore has been pointed out, each includes a means for causing intermittent or periodic rotary movements through 180° of the shaft which that mechanism drives.

In Fig. 26, the driven shafts 97, 165 and 240 of the driving mechanisms D, D—1, and D—2 are shown as carrying discs 286, 286—a and 286—b, respectively. Each of these discs is keyed to its shaft as indicated for the disc 286—b in Fig. 22. Each of these discs carries a pivoted pawl 287 which is urged continuously by a spring 290 (see Fig. 23) to position to engage the teeth of a ratchet wheel 288 which is keyed to a sleeve that is loose on the driven shaft. (See the sleeve 289 of the drive mechanism D—2 of Fig. 22.) The sleeve 289 of the mechanism D—2, shown in Fig. 22, carries a worm wheel 292, driven by a worm 293. The sleeve is journaled in bearings in a worm wheel housing 294. The other drive mechanisms, D and D—1, have like parts. The housings of all these drive mechanisms are indicated diagrammatically in Fig. 26, all being designated 294.

So long as the pawl 287 is in engagement with the ratchet wheel 288, rotation of the sleeve will be attended by rotation of the disc 286 and of the driven shaft of the drive mechanism. If, however, the pawl be disengaged from the ratchet wheel, the rotary movement of the disc 286 and of the driven shaft will cease while the sleeve may continue to rotate. For effecting disengagement of the pawl from the ratchet wheel at the end of each rotary movement of the shaft through 180°, I may make use of a pair of pawl releasing pins 296. These pawl releasing pins are spaced 180° apart and are carried by pistons 297 which are reciprocable in cylinders 298. Expansion springs 299 urge the pistons 297 outward in their cylinders and tend to maintain the outer ends of the pins 296 in the path of movements of the tail-pieces 300 of the pawls 287. Thus, at the end of each rotary movement of the disc 286 through 180°, the tail piece of the associate pawl 287 will have come in contact with one of the associate pins 296 and such pawl then will be moved out of engagement with its ratchet wheel. After a suitable interval of time, the pin that is holding the associate pawl out of engagement with its ratchet wheel may be retracted by the inward movement of the pin supporting piston in its cylinder 298, such movement of the piston being effected by the admission of pressure fluid to the outer end of the cylinder, as through the pipe 301 or 302, Figs. 22, 23 and 26.

Figure 25:
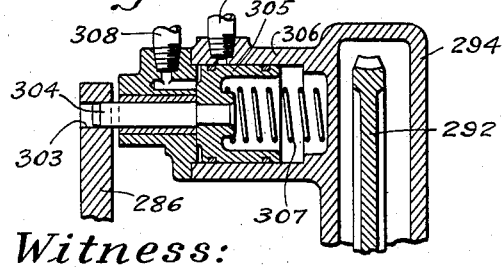
Fig. 25 is a relatively enlarged sectional view along the line 25—25 of Fig. 23.

The driven disk of the intermittent driving unit just described is prevented positively against resuming rotation with the associated driving sleeve until the proper time in the cycle of operations of the machine. To this end, the driven disk is provided with diametrically opposite openings, such as that indicated at 303 in the disk 286 of the drive mechanism D of Figs. 23 and 25, and as indicated diagrammatically in Fig. 26. A locking pin 304 is projected into one of these openings 303 of each of these disks each time the rotary movement of that disk has been halted in the manner above described. This pin 304 is carried by a piston 305 which is reciprocable in a cylinder 306. The cylinder 306 is shown as being integral with the housing for the worm wheel of the driving mechanism in which such cylinder is incorporated. An expansion spring 307 tends to urge the piston 305 to the limit of its outward movement in the cylinder 306, whereby to maintain the pin 304 in its projected disk locking position. At the proper time, air pressure may be supplied to the outer end of the cylinder 306, as through the pipe 308 for the drive mechanism D, the pipe 308a for the mechanism D—1, and the pipe 308b for the mechanism D—2. This will effect retraction of the piston and will withdraw the locking pin 304 from the opening in the associate disk 286, 286a or 286b. It is to be noted by reference to Fig. 26 that the air for retracting the pawl releasing pins of these respective driving mechanisms is obtained from the cylinder of the associate locking device, through a pipe 291, or 291a or 291b, and that air is not supplied to the cylinders for retracting the pawl releasing pins until after the locking pin has been retracted. This precludes accidental re-establishment of the driving connection between the pawl carrying disk and the rotating ratchet wheel of a drive mechanism before the disk has been released from its locking device. It is to be noted further by reference to Fig. 26 that the air supply line 308 of the disk-locking device of the drive mechanism D includes a series of valves 295, one for each glass gathering and parison forming unit. As shown, each of these valves comprises a transversely apertured portion of the piston rod of the parison mold opening and closing mechanism, and a tubular prolongation of a head of the cylinder of such mechanism (see Fig. 9, also). Each valve 295 will be open only when the associate parison mold opening and closing mechanism has acted to close the halves of its mold.

The worm 293 of the driving mechanism D—2 is driven by a sprocket 309, Fig. 3. A chain 310 connects the sprocket 309 with a sprocket 311 on the driven shaft of a Reeves drive 312. The Reeves drive is driven by suitable motion transmitting connections, indicated at 313, with a motor 314.

Figure 22:
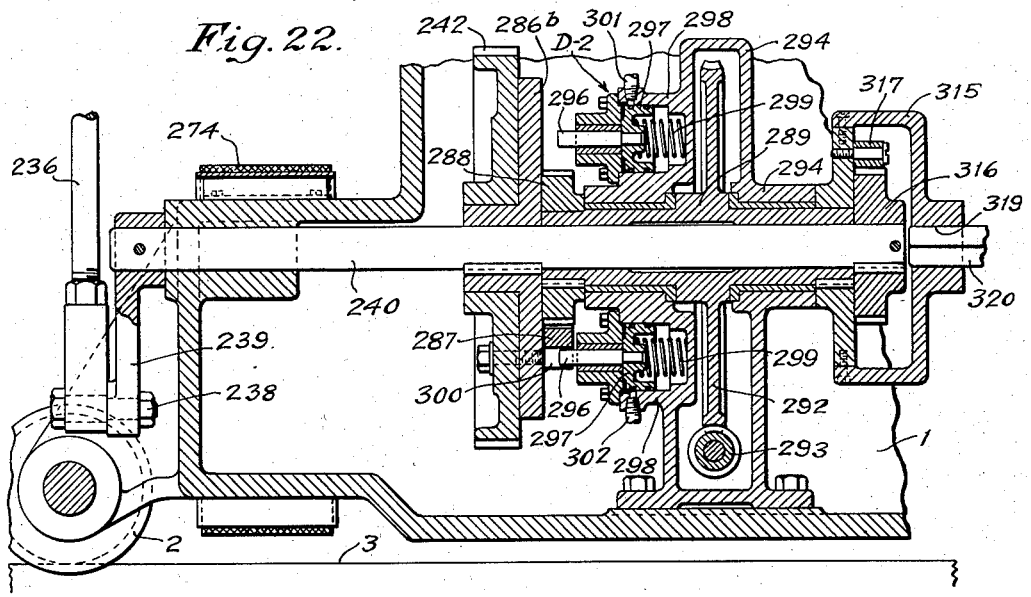
Fig. 22 is a fragmentary vertical sectional view, somewhat enlarged, of one of the driving mechanisms of the machine.
Figure 23:
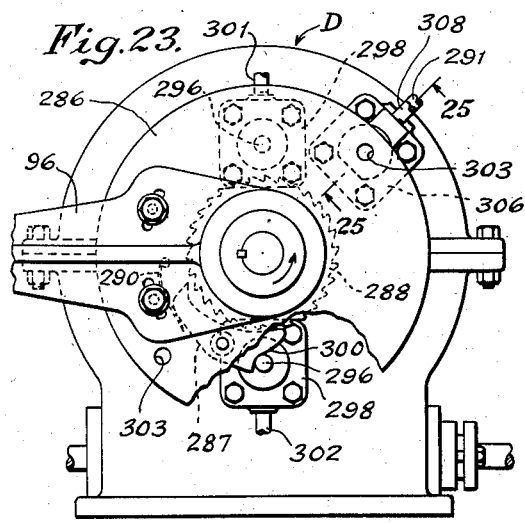
Fig. 23 is an end view of another of the driving mechanisms of the machine.
Figure 24:
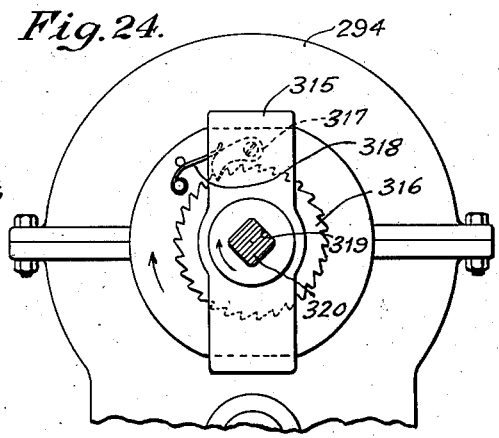
Fig. 24 is an end view of the mechanism shown in Fig. 22, looking from the right hand side of the sheet.

The sleeve 289 of the driving mechanism D—2 carries a rotating housing 315 in which is disposed a ratchet wheel 316 (see Fig. 22). The ratchet wheel 316 is pinned to the shaft 240. A pawl 317, Figs. 22 and 24, is pressed by a spring 318 against the teeth of the ratchet wheel 316. The rotation of the ratchet wheel by the shaft 240 is in the proper direction to permit the pawl to ride over the teeth of the ratchet wheel 316, the purpose of this ratchet wheel being to prevent over-run of the driven shaft when the load is reversed. Each of the driving mechanisms D, D—1, and D—2 preferably has one of these over-run preventing devices.

The rotary housing 315 of the driving mechanism D—2 has a hub provided with an axial opening 319 of non-circular configuration for the reception of a similarly configured end portion of a shaft 320. This shaft 320 is shown in Fig. 3 as driving a worm 321 by which the timing mechanism, designated generally at T, is driven. This driven shaft 320 also drives a sprocket 322, which is connected by a chain indicated at 323, with a sprocket 324 on a countershaft 325. A sprocket on the latter 326 actuates a chain 327 to drive a sprocket 328 on a shaft 329. The shaft 329 serves to drive the conveyor belt 274 in a manner which will be hereinafter pointed out.

The disk 286b of the driving mechanism D—2 is shown as carrying the gear 242, hereinbefore referred to as part of the mechanism for raising and lowering the parison transfer and article takeout mechanism.

The worm of each of the drive mechanisms D and D—1 is driven by any suitable connection with its associate motor.

The glassware conveyor

The conveyor 274 is shown as an endless belt. A removable bracket 330 is secured to the main frame structure at one end so as to project from one side of the latter shown in Figs. 1, 2, 3 and 4. This bracket carries shafts which in turn carry guiding and supporting rolls 331 and 332 and the driving roll 333. As best seen in Fig. 4, the roller 332 is carried by a shaft 334 which is supported by the slidably mounted blocks 335, Figs. 1 and 4. These blocks may be adjusted by adjusting screws 336, threaded through lugs 337 on the bracket 330, Fig. 4, to maintain the conveyor belt taut. The driving roll 333 receives motion through the agency of the hereinbefore pointed out driving connections between its shaft and the shaft 320 of the driving mechanism D—2.

The opposite end portion of the endless conveyor belt is supported and guided by a guide roll 338 on a removable bracket 339 that projects from the opposite side of the main frame structure, as best seen in Figs. 2 and 3. By interchanging the brackets 339 and 330 and making such changes in the driving connections between the driven roll of the conveyor and the driving mechanism as are necessitated by this interchange, the direction of movement of the glassware conducting stretch of the conveyor belt may be reversed so that glassware may be delivered at the side of the machine opposite to that at which delivery will be effected according to the arrangement shown in Figs. 2 and 3.

The timer and air actuated and air applying parts controlled thereby

The timer T, per-se, forms no part of the present invention, but preferably is of a construction generally similar to that shown in British Patent No. 257,637, of Sept. 7, 1926, granted to the Hartford-Empire Company. It is sufficient to say that this timer, which is shown more or less diagrammatically in certain views of the drawings, particularly Figs. 1, 3 and 26, includes a rotary drum and actuators adjustable on its surface for controlling individual valves of a valve chest 340. These individual valves control the respective air lines which are shown diagrammatically in Fig. 26 as leading from the valve chest to the respective air applying or air operated parts of the machine. The operations of these parts and the manner in which they may be controlled and regulated by the timer are thought to have been sufficiently stated.

The general operation

The general operation and advantages of the complete machine, as well as the functions and operations of the cooperative parts thereof, are thought to have been sufficiently stated in the general statement of the invention and in the foregoing descriptive matter, or to be obvious therefrom.

It is to be understood that various changes from the construction shown in the drawings and in the combination and arrangement of the structural features thereof and of the steps of the method of the invention may be made without departing from the spirit and scope of that invention. The invention therefore is not to be limited beyond the plain meaning of the terms of the appended claims.

I claim:

1. In a glassware fabricating machine, the combination with a bank of finishing molds, a bank of glass gathering and parison forming molds disposed at a level above that of the finishing molds, a carriage supporting said glass gathering and parison forming molds, means for reciprocating said carriage to move the glass gathering and parison forming molds from positions above and in alignment with the corresponding finishing molds to positions to gather glass from a gathering pool, means for causing the paths of movement of glass gathering and parison forming molds to converge as they approach said gathering positions, means for causing glass of the pool to fill said molds when they are at their gathering positions, means for severing the connecting glass between the pool and the glass in each of said molds when said mold has been filled, a separable cup individual to each mold for receiving excess glass issuing from the mold after said severing operation, a second severing means for cutting off the excess glass, and means for transferring parisons from the parison molds to the finishing molds and for simultaneously taking-out articles of glassware from the finishing molds.

2. In a glassware fabricating machine, a plurality of similar molds, means for moving said molds simultaneously between horizontally spaced stations, and means for causing said molds to be moved closer together as they approach one of said stations than when they approach the other of said stations.

3. In a glassware fabricating machine, a bank of molds, means for moving said bank of molds between positions at which said molds may receive charges of glass and positions at which glass parisons may be transferred from said molds to associate molds, and means for causing a decrease in the spacing between the adjacent molds of said bank as said molds approach the glass receiving positions and an increase in the spacing between said molds as said molds approach said parison transfer positions.

4. In a glassware fabricating machine, a bank of spaced molds comprising a middle mold and molds at the opposite sides of said middle mold, means for moving said bank of molds between positions at which said molds may receive charges of glass and positions at which parisons may be transferred from said molds to associate molds, and means for causing said side molds to move toward said middle mold as said molds approach their glass receiving positions and to move away from said middle mold as the molds are returned toward said parison transfer positions.

5. In a glassware fabricating machine, a glass gathering and parison forming mold, means for reciprocating said mold between a glass gathering position in contact with a gathering pool of molten glass and a parison transfer position spaced horizontally from said gathering position, and means for imparting a lateral component of movement in one direction to said mold as it is moved toward its glass gathering position and a lateral component of movement in the opposite direction to said mold as it is moved toward said parison transfer position.

6. In a glassware fabricating machine, the combination with a glass gathering pool, of a carriage adjacent thereto, a bank of molds supported on said carriage, each of said molds being adapted to gather glass by suction from said pool when the lower end of the mold is in contact with said pool, means for moving said carriage between a position to dispose the lower ends of said molds in glass gathering contact with said pool and a position to dispose said molds laterally of said pool, and means for causing said molds to be disposed closer to each other when said carriage is at its first named position than when at said second named position.

7. In a glassware fabricating machine, a substantially horizontally movable carriage, molds supported on said carriage and movable therewith between positions in glass gathering contact with a pool of molten glass and other positions spaced horizontally from said pool, a crank moving through 180° in each of intermittent movements, and mechanism connecting said crank and said carriage for reciprocating the latter so as to move said molds periodically between their said horizontally spaced positions, said connecting mechanism between said crank and the carriage including an air motor for causing part of each of said reciprocatory movements of the carriage.

8. In a glassware fabricating machine, a mold, means for moving said mold between a position at which glass may be gathered by said mold from a pool of molten glass and a second position spaced horizontally from said gathering position, means for severing the glass in the mold from the adajcent glass at said second position, means for moving said mold between said second position and a third position spaced horizontally from said second position and located a greater distance from said glass gathering position than said second position, and means for removing the glass from the mold at said third position.

9. In a glassware fabricating machine, a substantially horizontally movable carriage, a frame structure pivotally supported at one end on said carriage so that the opposite end thereof may swing about a vertical axis, a mold supported on said frame structure at the free end of the latter, means for reciprocating said carriage, a cam track adjacent to said carriage, and means connected with said pivoted frame structure and cooperating with said cam track to swing the free end of said frame structure and the mold supported thereon laterally as said carriage is reciprocated.

10. In a glassware fabricating machine, a casing open at one end and closed at the opposite end thereof, a mold comprising a pair of separable sections, holders for said sections, arms carrying said holders and pivotally supported on said casing at the open end of the latter, mold opening and closing mechanism connected with said arms and housed within said casing, said arms and holders for the sections of said mold being formed to provide air conducting passages continuously communicating at one end with the interior of the casing and leading to the walls of the sections of the mold, and means for introducing cooling fluid into said casing, said passages being adapted to discharge cooling air against the walls of said mold sections and downwardly along said mold sections.

11. In a glassware fabricating machine, a casing open at one end and closed at the opposite end thereof, a mold comprising a pair of separable sections, holders for said sections, arms carrying said holders and pivotally supported on said casing at the open end of the latter, mold opening and closing mechanism connected with said arms and housed within said casing, said arms and holders for the sections of said mold being formed to provide air conducting passages communicating at one end with the interior of the casing and leading to the walls of the sections of the mold, said passages being adapted to discharge cooling air against the walls of said mold sections and downwardly along said mold sections, means for introducing cooling air into said casing, and means at the lower end of said mold for deflecting upwardly the cooling air that has been directed downwardly adjacent to the sections of the mold.

12. In a glassware fabricating machine, a glass gathering and parison forming unit comprising a mold, said mold comprising a partible body and a partible neck ring, means for supporting the parts of the body of the mold and the parts of the neck ring for opening and closing movements, a vertically movable neck pin, a head supported above said neck ring for supporting and guiding said neck pin for cooperation with said neck ring and for applying sub-atmospheric pressure to the interior of the neck ring and between the separable portions of the mold body and neck ring, said head also being adapted to apply superatmospheric pressure to the interior of said neck ring alternatively with the application of sub-atmospheric pressure thereto, means for applying a cooling fluid to the interior of said head, a valve for controlling the application of sub-atmospheric pressure to said head and between said separable portions of the mold body and neck pin, and means mounted for movement with said neck pin for opening said valve when the neck pin has been lowered.

13. In a glassware fabricating machine, a glass gathering and parison forming unit comprising a mold, said mold comprising a partible body and a partible neck ring, means for supporting the parts of the body of the mold and the parts of the neck ring for opening and closing movements, a vertically movable neck pin, a head supported above said neck ring for supporting and guiding said neck pin for cooperation with said neck ring and for applying sub-atmospheric pressure to the interior of the neck ring and between the partible portions of the body of said mold and said neck ring, said head also being adapted to apply superatmospheric pressure to the interior of said neck ring alternatively with the application of sub-atmospheric pressure thereto, a valve for controlling the application of sub-atmospheric pressure to said head and between said separable parts of the mold, means mounted for movement with said neck pin for opening said valve when the neck pin has been lowered, and other valve means operated by the movement of said neck pin for preventing passage of super-atmospheric pressure between the parts of the mold during the application of said super-atmospheric pressure to the interior of said neck ring.

14. In a glassware fabricating machine, a glass gathering and parison forming mold, means for supporting and operating said mold to move it periodically to and from a glass gathering position at the surface of a pool of molten glass, means for causing suction within the mold when it is in its glass gathering position, means for severing the connecting glass between the glass in the mold and the pool as said mold moves away from its glass gathering position, and other means spaced vertically from said first named severing means for cutting off excess glass below said mold after the separation of the glass in the mold from the glass of said pool.

15. In a glassware fabricating machine, a glass gathering and parison forming mold movable periodically to and from a glass gathering position in contact with the surface of a pool of molten glass, means for causing suction within the mold to effect filling of the mold when it is at its said glass gathering position, means for severing the connecting glass between the glass in the mold and the glass of the pool after said mold has been filled, means for causing relatively hot and fluid glass to issue from the lower end of the mold, and means spaced vertically from said first named severing means for severing the said issued glass from the glass in the mold.

16. In a glassware fabricating machine, a glass gathering and parison forming mold movable to and from a glass gathering position at the surface of a pool of molten glass, means for causing glass of the pool to fill said mold when it is in its said glass gathering position, a severing device for separating the glass of the mold from the glass of the pool when said mold has been filled, a receptacle above said severing device and below said mold for supporting glass issuing from the lower end of said mold after said separation has been effected, and a second glass severing device above said receptacle for cutting off the glass supported in said receptacle from the glass within said mold.

17. In a glassware fabricating machine, a glass gathering and parison forming mold movable to and from a glass gathering position at the surface of a pool of molten glass, means for causing glass of the pool to fill said mold when it is in its said glass gathering position, a severing device for separating the glass of the mold from the glass of the pool when said mold has been filled, a receptacle above said severing device and below said mold for supporting glass issuing from the lower end of said mold after said separation has been effected, a second glass severing device above said receptacle for cutting off the glass supported by said receptacle from the glass within said mold, a cullet chute adjacent to said pool, and means for moving said receptacle periodically to position to deliver glass from said receptacle to said cullet chute.

18. In a glassware fabricating machine, a combination with a gathering pool of molten glass and a cullet chute adjacent thereto of a carrier movable from a position over a portion of the gathering pool and a position over said cullet chute, a pair of shear blades supported on said carrier, a pair of cooperative cup sections supported on said carrier above said shear blades, means for opening and closing said shear blades and said cup sections, a second pair of shear blades above said cup sections and supported on said carrier, means for opening and closing said last named shear blades at times predetermined with relation to the times of opening and closing of said first named shear blades and said cup sections.

19. In a glassware fabricating machine, a glass gathering and parison forming mold movable to and from a glass gathering position at the surface of a pool of molten glass, means for causing glass of the pool to fill said mold when the mold is at its glass gathering position, means for severing the glass between the mold and the pool when said mold has been filled, a partible cup for supporting glass depending from the mold after said severing operation, means for cutting off the glass depending from the mold, means for moving said cup laterally of the pool, means for opening the cup when in position to permit the delivery of the glass therein to a cullet receptacle, and means for cooling the walls of said cup.

20. In a glassware fabricating machine, the combination with vertically spaced parison and blow molds, the parison mold being below the blow mold, and a conveyor below and spaced from the blow mold, of mechanism for simultaneously transferring a parison from the parison mold to the blow mold and an article of glassware from the blow mold to the conveyor, said mechanism comprising vertically spaced pairs of tongs, vertically movable and horizontally shiftable carriers for the respective component members of said pairs of tongs, means for moving said carriers vertically between positions to permit one of said pairs of tongs to grip a parison in the parison mold and the other pair of tongs to grip an article in the blow mold and a position to cause said first named tongs to deliver said parison to the blow mold and said article of glassware to the conveyor, means for shifting said carriers horizontally to grip and release the parison and the article of glassware at the proper times, and means for tilting the members of the lower tongs upwardly to clear the article of glassware delivered to the conveyor as such article is released by said lower tongs.

21. In a glassware fabricating machine, a combined parison transfer and article take-out mechanism, comprising a pair of substantially parallel elongate vertical carriers, vertically spaced pairs of tongs supported on said carriers, the component members of each pair of tongs being carried by the respective carriers, means for simultaneously moving said carriers vertically between predetermined limits, and means for moving said carriers apart and toward each other to open and close said tongs.

22. In a glassware fabricating machine, the combination with vertically spaced parison and blow molds, the parison mold being below the blow mold, and a conveyor below and spaced from the blow mold, of mechanism for transferring a parison from the parison mold to the blow mold and an article of glassware from the blow mold to the conveyor simultaneously, said mechanism comprising vertically spaced pairs of tongs, vertically movable and horizontally shiftable carriers for the respective component members of said pairs of tongs, means for moving said carriers vertically between positions to permit one of said pairs of tongs to grip a parison in the parison mold and the other pair of tongs to grip an article in the blow mold and a position to cause said first named tongs to deliver said parison to the blow mold and said article of glassware to the conveyor, and means for shifting said carriers horizontally to grip and release the parison and the article of glassware at the proper times.

23. In a glassware fabricating machine, a blow mold unit comprising a casing, a cylinder carried by the casing at one end thereof, pivoted arms supported by the casing at the opposite end thereof, a mold comprising separable sections carried by said pivoted arms, a piston reciprocable in said cylinder, operating mechanism housed within said casing and connecting said piston with said pivoted arms for opening and closing the sections of said mold, a blow head for said mold, means supporting said blow head on said casing, a bottom plate for said mold, means for supporting said bottom plate on said casing, and a supporting structure on which said casing and the aforesaid parts carried and supported thereby may be moved as a unit.

24. In a glassware fabricating machine, a blow mold unit comprising a casing, a cylinder carried by the casing at one end thereof, pivoted arms supported by the casing at the opposite end thereof, a mold comprising separable sections carried by said pivoted arms, a piston reciprocable in said cylinder, operating mechanism housed within said casing and connecting said piston with said pivoted arms for opening and closing the sections of said mold, a blow head for said mold, means supporting said blow head on said casing, a bottom plate for said mold, means for supporting said bottom plate on said casing, a supporting structure on which said casing and the aforesaid parts carried and supported thereby may be moved as a unit, means for guiding said casing in its movements on said supporting structure, and means for locating said casing in a predetermined position on said supporting structure.

25. The combination with a glass gathering pool having walls formed to provide an open space above the pool for the admission of glass gathering molds, the edges of the walls defining said open space being substantially inclined with respect to the horizontal, an inclined closure movable periodically to position substantially to close said open space above the glass gathering pool and periodically to position to expose said gathering pool so as to permit periodic glass gathering operations, and a skimmer carried by said inclined closure for skimming chilled glass from the pool at the gathering places toward the outer edge of the pool as said closure is moved toward its closed position.

26. The combination with a container for a pool of molten glass, the wall of said container being formed to provide an inclined opening above a portion of the glass of the pool, glass gathering means movable periodically through said opening to and from position to gather glass from the pool, a closure adapted to close said opening, means for supporting said closure for swinging movement about a horizontal axis to and from its closed position, intermittently acting mechanism connected with said closure supporting means for swinging said closure periodically to its closed position and periodically therefrom, a skimmer blade movably supported on said closure, means for reciprocating said skimmer blade edgewise on said closure and parallel therewith to project said skimmer blade beyond the lower end of the closure so as to skim glass from the surface of the pool at the gathering station during movement of the closure toward its closed position and then to retract said skimmer blade as said closure approaches its closed position, and means for timing said periodic movements of said closure with relation to the periodic movements of said glass gathering means to and from the glass gathering position of the latter.

27. In the manufacture of hollow glassware, the method which comprises bringing a suction gathering mold to the surface of a supply pool of molten glass, gathering glass from the pool in said mold, raising the mold and the glass therein from the surface of the pool, severing the connecting glass between the glass in the mold and the glass of the pool, permitting glass to issue from the lower end of the mold after said severing operation, supporting from below the glass between the plane of said severance and the lower end of the mold, and cutting off from the glass in said mold the glass thus supported from below.

28. In the manufacture of hollow glassware, the method which comprises bringing a glass gathering and parison forming mold to glass gathering relation with the glass of a supply pool, causing a suction within said mold to draw thereinto glass from the pool, raising the mold and the glass therein from the pool, severing the connecting glass between the lower end of the mold and the pool, permitting a relatively hot portion of the glass in the mold to issue from the lower end of the mold, supporting from below the glass extruding from the lower end of the mold, severing the issued glass from the glass in the mold while continuing to support said issued glass from below, and delivering to a cullet receptacle the glass thus separated from the glass in the mold.

29. In the manufacture of hollow glassware, the method which comprises bringing a glass gathering and parison forming mold to a glass gathering position at the surface of a pool of molten glass, causing glass from the pool to enter said mold, raising the mold and the glass therein from the surface of the pool, severing the connecting glass between the lower end of the mold and the glass in the pool, causing a central portion of the glass in the mold to move downwardly and a portion thereof to extrude from the lower end of the mold, supporting the extruded glass from below, severing the extruded glass from the glass in the mold while continuing to support the extruded glass from below, thus producing a hollow parison in the mold, transferring the parison from the parison mold to a finishing mold, blowing the parison to final form in the finishing mold, and taking out the finally blown article from the finishing mold.

30. In apparatus for fabricating glassware, the combination with a container for a pool of molten glass, the container having an opening in its top to expose a surface portion of the glass of the pool, a bank of glass gathering and parison forming molds, a carriage supporting said molds, means for reciprocating said carriage to move said molds through said opening in the top wall of said container to and from positions to gather glass from said pool, means for causing the paths of movement of said molds to converge as they approach said opening in the container top and to diverge as they move away from said opening, means for discharging cooling air against the walls of said molds and downwardly along said walls, means at the lower ends of said molds for deflecting upwardly the cooling air to prevent such cooling air from blowing downwardly onto the pool of glass when said molds are at their glass gathering positions, a movable closure for the opening in the top of the container, means for swinging said closure to position to close said opening when said molds have been moved outwardly through said opening and for removing said closure from its closed position as said molds are moved inwardly toward said opening, a skimmer blade movably supported on said closure, means for reciprocating said skimmer blade edgewise on said closure to project the skimmer blade beyond the adjacent end of the closure so as to skim glass from the surface of the pool at the gathering stations of said molds toward the edge of the pool during movement of the closure toward its closed position and to retract said skimmer blade onto the closure as said closure approaches its closed position, and means for timing the movements of said closure, said skimmer blade and said bank of molds, each with relation to the others.

ALGY J. SMITH.